United States Patent
Ershov et al.

(10) Patent No.: US 12,260,856 B2
(45) Date of Patent: Mar. 25, 2025

(54) METHOD AND SYSTEM FOR RECOGNIZING A USER UTTERANCE

(71) Applicant: YANDEX EUROPE AG, Lucerne (CH)

(72) Inventors: Vasily Alekseevich Ershov, Sankt-Peterburg (RU); Igor Evgenevich Kuralenok, Sankt-Peterburg (RU)

(73) Assignee: Y.E. Hub Armenia LLC, Yerevan (AM)

( * ) Notice: Subject to any disclaimer, the term of this patent is extended or adjusted under 35 U.S.C. 154(b) by 277 days.

(21) Appl. No.: 18/081,634

(22) Filed: Dec. 14, 2022

(65) Prior Publication Data

US 2023/0206910 A1 Jun. 29, 2023

(30) Foreign Application Priority Data

Dec. 23, 2021 (RU) .......................... RU2021138538

(51) Int. Cl.
| | |
|---|---|
| *G10L 15/30* | (2013.01) |
| *G10L 15/06* | (2013.01) |
| *G10L 15/16* | (2006.01) |
| *G10L 15/18* | (2013.01) |
| *G10L 15/26* | (2006.01) |

(52) U.S. Cl.
CPC ........ *G10L 15/1815* (2013.01); *G10L 15/063* (2013.01); *G10L 15/16* (2013.01); *G10L 15/26* (2013.01); *G10L 15/30* (2013.01)

(58) Field of Classification Search
CPC .... G10L 15/1815; G10L 15/063; G10L 15/30
See application file for complete search history.

(56) References Cited

U.S. PATENT DOCUMENTS

| | | |
|---|---|---|
| 6,754,626 B2 | 6/2004 | Epstein |
| 7,640,160 B2 | 12/2009 | Di Cristo et al. |

(Continued)

FOREIGN PATENT DOCUMENTS

| | | |
|---|---|---|
| WO | 2019103569 A1 | 5/2019 |
| WO | 2021086589 A1 | 5/2021 |
| WO | 2021118462 A1 | 6/2021 |

OTHER PUBLICATIONS

Aleksic et al., "Bringing Contextual Information to Google Speech Recognition", Interspeech 2015, Sep. 2015, International Speech Communications Association, pp. 5.

(Continued)

*Primary Examiner* — Ibrahim Siddo
(74) *Attorney, Agent, or Firm* — BCF LLP

(57) ABSTRACT

A method and a server for generating textual representations of a user utterance are provided. The method comprises: acquiring an audio signal being an audio representation of the user utterance, the user utterance being in response to a given machine-generated utterance previously outputted by the electronic device to the user; acquiring a machine-generated text string being a textual representation of the given machine-generated utterance; generating, using a Speech-to-Text (STT) model, an other text string based on the audio signal and the machine-generated text string, the other text string being a textual representation of the user utterance while taking into account the machine-generated text string as a context of the user utterance.

20 Claims, 8 Drawing Sheets

(56) References Cited

U.S. PATENT DOCUMENTS

| | | | |
|---|---|---|---|
| 7,949,529 | B2 | 5/2011 | Weider et al. |
| 8,862,467 | B1 | 10/2014 | Casado et al. |
| 9,858,925 | B2 | 1/2018 | Gruber et al. |
| 10,091,140 | B2 | 10/2018 | Galley et al. |
| 10,223,067 | B2 | 3/2019 | Morris et al. |
| 10,248,383 | B2 * | 4/2019 | Fujii .................. G06F 40/35 |
| 10,417,266 | B2 | 9/2019 | Patel et al. |
| 10,515,625 | B1 | 12/2019 | Metallinou et al. |
| 10,726,831 | B2 | 7/2020 | Di Fabbrizio et al. |
| 10,868,778 | B1 | 12/2020 | Taylor et al. |
| 10,878,808 | B1 | 12/2020 | Mathias et al. |
| 10,997,968 | B2 | 5/2021 | Wanas et al. |
| 11,043,214 | B1 | 6/2021 | Hedayatnia et al. |
| 2012/0245944 | A1 | 9/2012 | Gruber et al. |
| 2013/0110515 | A1 | 5/2013 | Guzzoni et al. |
| 2015/0187359 | A1 | 7/2015 | Bhaskaran |
| 2017/0242886 | A1 | 8/2017 | Jolley et al. |
| 2018/0054523 | A1 | 2/2018 | Zhang et al. |
| 2018/0174020 | A1 | 6/2018 | Wu |
| 2018/0247648 | A1 | 8/2018 | Nadimpalli et al. |
| 2019/0005138 | A1 | 1/2019 | Andreica et al. |
| 2019/0287517 | A1 | 9/2019 | Green et al. |
| 2020/0035217 | A1 * | 1/2020 | Chae .................. G10L 13/00 |
| 2020/0210649 | A1 | 7/2020 | Lewis et al. |
| 2020/0380076 | A1 | 12/2020 | Taylor |
| 2020/0382448 | A1 | 12/2020 | Taylor |
| 2021/0090563 | A1 | 3/2021 | Kim et al. |
| 2021/0104236 | A1 | 4/2021 | Doggett et al. |
| 2021/0166678 | A1 | 6/2021 | Lee et al. |
| 2021/0233522 | A1 | 7/2021 | Kikin-Gil et al. |

OTHER PUBLICATIONS

Text to speech, voice recognition—Yandex SpeechKit, Yandex. Cloud—Services, article retrieved on the Internet on Oct. 28, 2021.
Russian Search Report dated Jan. 13, 2023 issued in respect of the counterpart Russian Patent Application No. RU 2021138538.

* cited by examiner

METHOD AND SYSTEM FOR RECOGNIZING A USER UTTERANCE

CROSS-REFERENCE

The present application claims priority to Russian Patent Application No. 2021138538, entitled "Method of and System for recognizing a user utterance", filed Dec. 23, 2021, the entirety of which is incorporated herein by reference.

FIELD

The present technology relates generally to natural language processing; and in particular, to methods and systems for recognizing spoken human language.

BACKGROUND

Speech-to-text (STT) systems enable processing spoken human language to identify therein separate words, thereby translating human utterances into text. For example, such systems can be used in combination with so-called virtual assistant applications allowing for an improved interaction between a user and certain online services (for example, online shopping platforms, online booking systems, and the like) and/or their electronic device. This is especially the case when the user is a novice or an impaired user and is thus currently unable to use machine-user interfaces of such online services and/or those of the electronic device to effectively interact therewith. For example, a user who is driving or a user who is visually impaired may not be able to use the touch screen keyboard associated with their electronic device to navigate through a doctor's web site to make an appointment therewith or that of the online shopping platform to submit an order. At the same time, a customer service personnel of these online services may not be readily available to assist such users due to, for example, an increased number of requests from other users.

Thus, a given virtual assistant application providing functionality of an online conversation partner (also known as "chatbot" applications) can be used for navigating the user through a respective online service and completing their requests thereat. More specifically, the given virtual assistant application can be configured to initiate, whether in a textual or audial format, a conversation with the user, receive their request in a form of user utterance, and have the received utterance recognized by an STT system for further use in generating additional clarifying questions. By doing so, the given virtual assistant application can be said to mimic a human assisting the user by maintaining a conversation therewith.

For example, when the given virtual assistant application is used for scheduling medical appointments with a given doctor, it may be activated by the user contacting that doctor, such as by phone or starting a conversation on their web site, as an example, and may further be configured to greet the user and elicit their request by the phrase "Hello, you have reached the office of Doctor House. How can I be of service to you today?" In response, the user may utter the following phrase "I'd like to make an appointment with the doctor". Further, the given virtual assistant application can be configured to receive an audio representation of this user's request, generate, using the STT system, a textual representation thereof for further processing and providing a next clarifying question, such as that requesting certain user profile information, user availability, urgency of the appointment, and the like, a respective response to which the given virtual assistant application is configured to process similarly using the STT system. Finally, based on the so recognized voice answers from the user and, for example, doctor's availability, the given virtual assistant application may be configured to complete the user's request by scheduling the appointment for them and storing data indicative thereof in a doctor's schedule, which can be confirmed by the given virtual assistant application generating another response indicative of a following phrase: "Your appointment with Doctor House has been scheduled for Dec. 20, 2021 at 11 AM".

However, one of drawbacks of such applications can be the inability of the STT used therewith to deduce a context of words from received audio representations of user utterances. More specifically, without catching a context of the phrase, the STT system may not be able to properly identify semantic relations between certain words and may thus generate incorrect textual representations thereof. Referring back to the example above with regard to scheduling the appointment, the STT system may be pre-configured to expect a full form of address "the Doctor House", and may thus not be able to understand "the doctor" in the answer of the user, which may cause additional unnecessary questions for the user. In another example, having received an audio representation of user's first name and last name "Neville Longbottom", the STT system may generate a following textual representation "Neville long bottom" which does not correspond to the user profile data. This may result in the given virtual assistant application maintaining a poorer quality conversations with the user while implementing the user's request, thereby affecting the experience of the user interacting with the given virtual assistant application.

Certain prior art approaches have been proposed to tackle the above identified technical problem.

United States Patent Application Publication No.: 2019/0005138 A1 published on Jan. 3, 2019, assigned to Google LLC, and entitled "OBTAINING RESPONSIVE INFORMATION FROM MULTIPLE CORPORA" discloses techniques for automated assistants that search various alternative corpora for information.

United States Patent Application Publication No.: 2021/0166678 A1 published on Jun. 3, 2021, assigned to Samsung Electronics Co Ltd, and entitled "ELECTRONIC DEVICE AND CONTROLLING THE ELECTRONIC DEVICE" discloses an electronic device including a processor configured to determine whether to transmit, to a server storing a first dialogue system, a user speech that is input through the microphone, based on determining that the user speech is transmitted to the server, control the communicator to transmit the user speech and at least a part of the stored dialogue history information to the server.

United States Patent Application Publication No.: 2020/0382448 A1 published on Jul. 21, 2020, assigned to Microsoft Technology Licensing LLC, and entitled "CONTEXTUAL FEEDBACK TO A NATURAL UNDERSTANDING SYSTEM IN A CHAT BOT" discloses a chat bot computing system including a bot controller and a natural language processor.

SUMMARY

It is an object of the present technology to ameliorate at least some of the inconveniences present in the prior art.

The developers of the present technology have appreciated that the quality of speech recognition provided by the STT system may be improved if the STT system could be configured to consider a latest generated phrase of the given virtual assistant application to the user as a context for their response thereto. More specifically, the developers have devised the STT system implemented based on machine-learning techniques (such as a neural network) which is trained to recognize the user utterances of the user based not only on corresponding textual representations thereof but also phrases in response to which the user provided those utterances.

The so trained STT system may thus be configured to translate each word in a given utterance into text within a specific context associated therewith, which is believed to improve the speech recognition and overall satisfaction of users using virtual assistant applications.

Thus, in accordance with a first broad aspect of the present technology, there is provided a method of generating textual representations of a user utterance. The user utterance is collected by an electronic device associated with a user. The user utterance is provided in response to machine-generated utterances outputted by the electronic device. The electronic device is configured to be communicatively coupled with a server. The server is for generating the machine-generated utterances. The method is executable by the server. The method comprising: acquiring, by the server from the electronic device, an audio signal being an audio representation of the user utterance, the user utterance being in response to a given machine-generated utterance previously outputted by the electronic device to the user; acquiring, by the server, a machine-generated text string being a textual representation of the given machine-generated utterance; generating, by the server using a Speech-to-Text (STT) model, an other text string based on the audio signal and the machine-generated text string, the other text string being a textual representation of the user utterance while taking into account the machine-generated text string as a context of the user utterance.

In some implementations of the method, the method further comprises: generating, by the server using the STT model, a first text string based on a first audio signal, the first audio signal being an audio representation of a first user utterance and the first text string being a textual representation of the first user utterance; generating, by the server using an other model, the machine-generated text string based on the first text string; generating, by the server using a Text-to-Speech (TTS) model, a machine-generated audio signal based on the machine-generated text string, the machine-generated audio signal being an audio representation of the machine-generated utterance.

In some implementations of the method, the STT model is a neural network (NN) having an encode-decoder architecture including an encoder stack of layers and a decoder stack of layers, and wherein the generating the other text string comprises: generating, by the server, using an acoustic embedding algorithm, an audio vector representative of the audio signal; inputting, by the server, the audio vector to the encoder stack of the NN; and generating, by the server, using a text embedding algorithm, a text vector representative of the machine-generated text string; inputting, by the server, the text vector to the decoder stack of the NN.

In some implementations of the method, the NN is a Transformer-based NN.

In some implementations of the method, the method further comprises, during a training phase, training the STT model based on a training set of data, the training set of data comprising a plurality of training objects, a given training object including: (i) an indication of a training audio signal generated based on a training user utterance uttered by a training user; (ii) a first training text string, the first training text string being a textual representation of the training user utterance; and (iii) a second training text string, the second training text string being a textual representation of a respective machine-generated utterance in response to which the training user has uttered the training user utterance, the second training text string used for providing a context for the first text string.

In some implementations of the method, the method further comprises acquiring, by the server, the first audio signal from the electronic device.

In some implementations of the method, the method further comprises transmitting, by the server, the machine-generated audio signal to the electronic device.

In some implementations of the method, the other model includes a Natural Language Processing (NLP) model.

In some implementations of the method, the one or more models are hosted by an other server.

In some implementations of the method, the NLP model is a Transformer-based NN model.

In some implementations of the method, the TTS model is a Transformer-based NN model.

In some implementations of the method, the method further comprises: generating, by the server using the STT model, a second text string based on a second audio signal, the second audio signal being an audio representation of a second user utterance, the second user utterance being a follow-up request to the machine-generated utterance; generating, by the server using the other model, an other machine-generated text string based on the second text string, the other machine-generated text string being a textual representation of an other machine-generated utterance to be provided to the user; generating, by the server using the TTS model, an other machine-generated audio signal based on the other machine-generated text string, the other machine-generated audio signal being an audio representation of the other machine-generated utterance to be provided to the user in response to the second user utterance; acquiring, by the server, a third audio signal from the electronic device, the third audio signal being an audio representation of a third user utterance, the third user utterance being an other follow-up request to the other machine-generated utterance; and generating, by the server using the STT model, a third text string based on the third audio signal, the machine-generated text string and the other machine-generated text string, the third text string being a textual representation of the third user utterance while taking into account the machine-generated text string and the other machine-generated text string as the context of the other follow-up request.

In some implementations of the method, the method further comprises transmitting, by the server, the other machine-generated audio signal to the electronic device.

Further, according to a second broad aspect of the present technology, there is provided a server for generating textual representations of a user utterance. The user utterance is collected by an electronic device, communicatively coupled with the server, associated with a user. The user utterance is provided in response to machine-generated utterances outputted by the electronic device. The server comprises: a processor; a non-transitory computer-readable medium storing instructions. The processor, upon executing the instructions, is configured to: acquire, from the electronic device, an audio signal being an audio representation of the user utterance, the user utterance being in response to a given machine-generated utterance previously outputted by the electronic device to the user; acquire, a machine-generated text string being a textual representation of the given machine-generated utterance; generate, using a Speech-to-Text (STT) model, an other text string based on the audio signal and the machine-generated text string, the other text string being a textual representation of the user utterance while taking into account the machine-generated text string as a context of the user utterance.

In some implementations of the server, the processor is further configured to: generate, using the STT model, a first text string based on a first audio signal, the first audio signal being an audio representation of a first user utterance and the first text string being a textual representation of the first user utterance; generate, using an other model, the machine-generated text string based on the first text string; generate, using a Text-to-Speech (TTS) model, a machine-generated audio signal based on the machine-generated text string, the machine-generated audio signal being an audio representation of the machine-generated utterance.

In some implementations of the server, the STT model is a neural network (NN) having an encode-decoder architecture including an encoder stack of layers and a decoder stack of layers, and wherein the processor is configured to generate the other text string by: generating, using an acoustic embedding algorithm, an audio vector representative of the audio signal; inputting the audio vector to the encoder stack of the NN; and generating, using a text embedding algorithm, a text vector representative of the machine-generated text string; inputting, the text vector to the decoder stack of the NN.

In some implementations of the server, the NN is a Transformer-based NN.

In some implementations of the server, the processor is further configured, during a training phase, to train the STT model based on a training set of data, the training set of data comprising a plurality of training objects, a given training object including: (i) an indication of a training audio signal generated based on a training user utterance uttered by a training user; (ii) a first training text string, the first training text string being a textual representation of the training user utterance; and (iii) a second training text string, the second training text string being a textual representation of a respective machine-generated utterance in response to which the training user has uttered the training user utterance, the second training text string used for providing a context for the first text string.

In some implementations of the server, the other model includes a Natural Language Processing (NLP) model.

In some implementations of the server, the one or more models are hosted by an other server to which the server is communicatively coupled.

In the context of the present specific, a "transformer" model is a model having an encoder-decoder architecture that employs attention mechanisms. Attention mechanisms may be employed during processing of data by the encoder, during processing of data by the decoder, and during encoder-decoder interactions. A variety of attention mechanisms may be employed as part of a transformer model.

Self-attention may be one of the components of the transformer model. The difference between attention mechanism and self-attention mechanism is that self-attention operates between representations of the same nature: e.g., all encoder states in some layer. Self-attention mechanism is a part of the transformer model where tokens interact with each other. Each token in a sense "looks" at other tokens in the sentence with an attention mechanism, gathers context, and updates the previous representation of "self". Each input token in a self-attention mechanism receives three representations: (i) query, (ii) key, and (ii) value. The query is used when a token looks at others—it's seeking the information to understand itself better. The key is responding to a query's request: it is used to compute attention weights. The value is used to compute attention output: it gives information to the tokens which "say" they need it (i.e. assigned large weights to this token).

Masked self-attention may be another component of the transformer model. The decoder usually includes this particular self-attention mechanism and which is different from the self-attention mechanism in the encoder. While the encoder receives all tokens at once and the tokens can look at all tokens in the input sentence, in the decoder, tokens are generated one at a time—during generation, the model does not know which tokens will be generated in future. To forbid the decoder to "look ahead", the transformer model uses masked self-attention—i.e., future tokens are masked out.

Multi-head attention is a further one of the components of the transformer model. It should be noted that understanding the role of a word in a sentence requires understanding how it is related to different parts of the sentence. This is important not only in processing source sentence but also in generating targets. As a result, this type of attention mechanism may allow the transformer model to "focus of different things". Instead of having one attention mechanism, multi-head attention has several "heads" which work independently. This may be implemented as several attention mechanisms whose results are combined.

The encoder of the transformer model can include an encoder self-attention mechanism and a feedforward network block. The encoder self-attention mechanism may be a multi-head attention mechanism used for tokens to "look" at each other. The queries, keys, values are computed from encoder states. The feedforward network block receives the information from tokens and processes that information.

The decoder of the transformer model can include a decoder self-attention mechanism (masked), a decoder-encoder attention mechanism, and a feedforward network. The decoder masked self-attention mechanism may be a masked multi-head attention mechanism used for tokens to "look" at previous tokens. The queries, keys, values are computed from decoder states. The decoder-encoder attention mechanism may be a multi-head attention mechanism used for target tokens to "look" at the source information. Queries are computed from decoder states, while keys and values are computed from encoder states. The feedforward network block receives the information from tokens and processes that information.

It can be said that in the encoder, tokens communicate with each other and update their representations. It can also be said that in the decoder, a target token first looks at previously generated target tokens, then at the source, and finally updates its representation. This can be repeated in several layers. In one non-limiting implementation, this can be repeated 6 times.

As mentioned above, in addition to an attention mechanism, a given layer has a feedforward network block. For example, the feedforward network block may be represented by two linear layers with a ReLU non-linearity between them. After looking at other tokens via an attention mechanism, a model uses a feedforward network block to process this new information. The transformer model may further comprise residual connections for adding a block's input to its output. Residual connections may be used for stacking layers. In a transformer model, residual connections can be used after a respective attention mechanism and feedforward network block. For example, an "Add & Norm" layer may be provided with (i) the input of an attention mechanism via a residual connection and (ii) the output of the attention mechanism. The result of this Add & Norm layer may then be provided to a feedforward network block or another attention mechanism. In another example, an "Add & Norm" layer may be provided with (i) the input of an feedforward network block via a residual connection and (ii) the output of the feedforward network block. As alluded to above, the transformer model may comprise Add & Norm layers. Broadly speaking, such a layer can independently normalize vector representation of each example in a batch—this is done to control "flow" to the next layer. Layer normalization may improve convergence stability and sometimes even quality.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
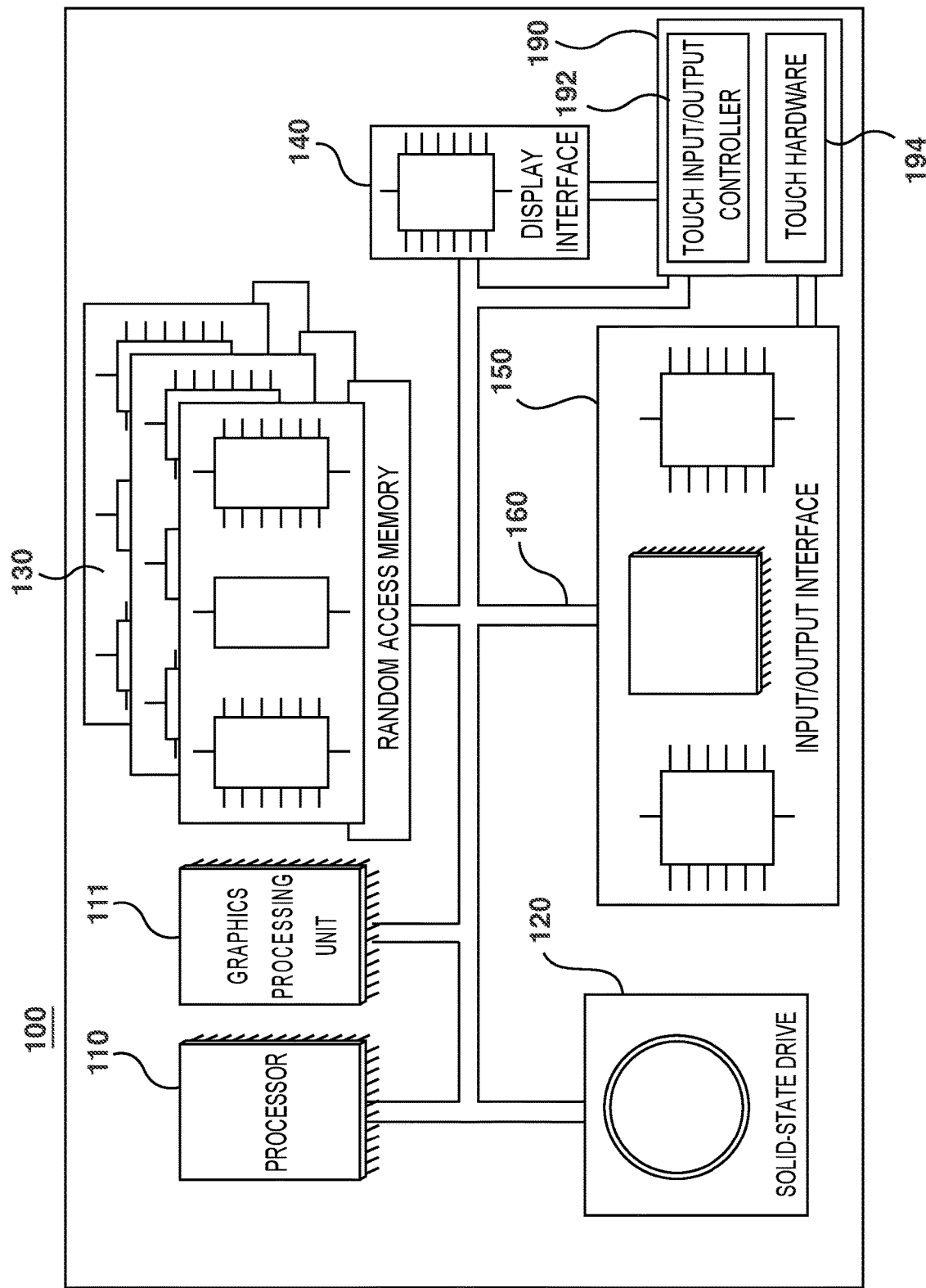
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit," may be provided through the use of dedicated hardware as well as hardware capable of executing software in association with appropriate software. When provided by a processor, the functions may be provided by a single dedicated processor, by a single shared processor, and/or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random-access memory (RAM), and/or non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

With reference to FIG. 1, there is depicted a computer system 100 suitable for use with some implementations of the present technology. The computer system 100 comprises various hardware components including one or more single or multi-core processors collectively represented by processor 110, a graphics processing unit (GPU) 111, a solid-state drive 120, a random-access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the computer system 100 in addition to or instead of the touchscreen 190. In some embodiments, the computer system 100 may comprise one or more microphones (not shown). The microphones may record audio, such as user utterances. The user utterances may be translated to commands for controlling the computer system 100.

It is noted some components of the computer system 100 can be omitted in some non-limiting embodiments of the present technology. For example, the touchscreen 190 can be omitted, especially (but not limited to) where the computer system is implemented as a smart speaker device.

According to implementations of the present technology, the solid-state drive 120 stores program instructions suitable for being loaded into the random-access memory 130 and executed by the processor 110 and/or the GPU 111. For example, the program instructions may be part of a library or an application.

Networked Computing Environment

Figure 2:
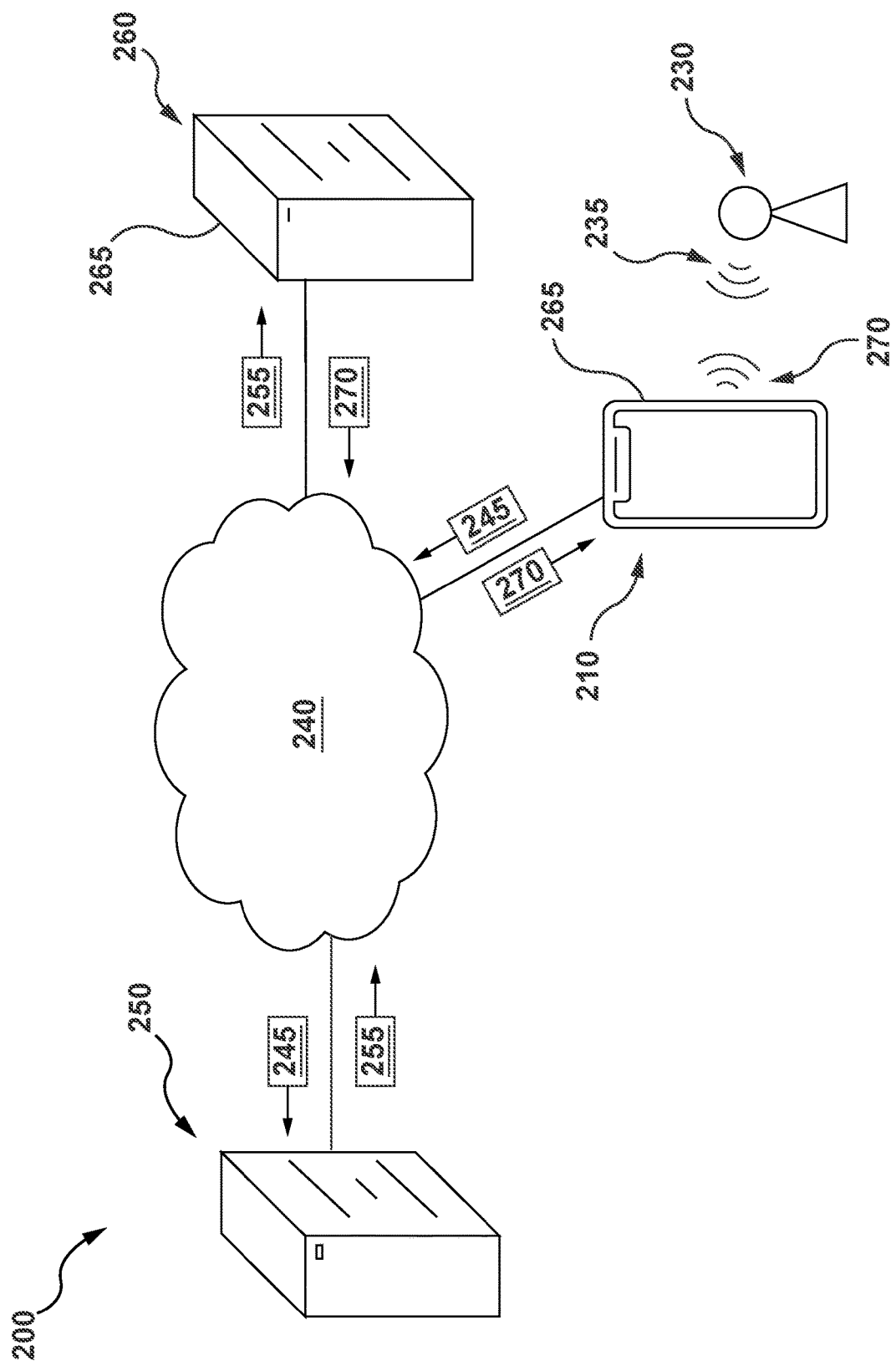
FIG. 2 depicts a networked computing environment suitable for some implementations of the present technology.

With reference to FIG. 2, there is depicted a schematic diagram of a networked computing environment 200 suitable for use with some embodiments of the systems and/or methods of the present technology. The networked computing environment 200 comprises a server 250 communicatively coupled, via a communication network 240, to an electronic device 210. In the non-limiting embodiments of the present technology, the electronic device 210 may be associated with a user 230.

In some non-limiting embodiments of the present technology, the server 250 is implemented as a conventional computer server and may comprise some or all of the components of the computer system 100 of FIG. 1. In one non-limiting example, the server 250 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 250 is a single server. In alternative non-limiting embodiments of the present technology (not depicted), the functionality of the server 250 may be distributed and may be implemented via multiple servers.

Further, the electronic device 210 may be any computer hardware that is capable of running a software appropriate to the relevant task at hand. Thus, some non-limiting examples of the electronic device 210 may include personal computers (desktops, laptops, netbooks, etc.), smartphones, and tablets. To that end, in some non-limiting embodiments of the present technology, the electronic device 210 can also comprise some or all components of the computer system 100 depicted in FIG. 1. It should be noted that the electronic device 210 can include additional components, such as a microphone (not separately depicted) for converting received sounds captured in a vicinity of the electronic device 210, such as utterances of the user 230, into a computer-readable format, such as digital audio format, including, for example, MP3, Ogg, and the like; and a speaker (also not separately depicted) for reproducing incoming audio signals in the vicinity of the electronic device 210, as will become apparent from the description provided below.

Further, in some non-limiting embodiments of the present technology, the networked computing environment 200 may comprise a second server 260 communicatively coupled, via the communication network 240, to the electronic device 210 and the server 250. As it can be appreciated, the second server 260 can be implemented similarly to the server 250.

According to certain non-limiting embodiments of the present technology, the networked computing environment 200 can be configured for providing and/or maintaining an automatic communication with the user 230, as will be described hereinbelow.

For example, in some non-limiting embodiments of the present technology, the second server 260 can be associated with a service providing entity providing services to users, such as the user 230, for assisting in receiving which, the second server 260 can be configured to host a given virtual assistant application 265. Accordingly, the second server 260 can be configured to provide access to the given virtual assistant application 265 to electronic device communicatively coupled to the communication network 240, such as to the electronic device 210.

Broadly speaking, the given virtual assistant application 265, also referred to herein as a chatbot application, may be configured for initiating and further maintaining an automatic communication with the user 230 aiding them in receiving services from the service providing entity associated with the second server 260. For example, the given virtual assistant application 265 can be activated by the user 230 contacting, using the electronic device 210, the service providing entity, such as by dialing an associated telephone number or launching the given virtual assistant application 265 on a web site associated with the service providing entity by actuating a respective actuator. Further, while maintaining the automatic communication with the user 230, the given virtual assistant application 265 can be configured for receiving a given user utterance 235, including a user request of the user 230, and providing thereto a machine-generated utterance 270, which may include additional questions clarifying details of the user 230 contacting the service providing entity.

Thus, it is not limited how the given virtual assistant application 265 is implemented and can depend on the services provided by the service providing entity associated with the second server 260. For example, if the service providing entity is one of a medical doctor and a medical clinic, the given virtual assistant application 265 can be configured for managing (such as scheduling, modifying, or cancelling) medical appointments therewith. In another example, the service providing entity may be an online shopping platform selling various items, such as goods and services, and the given virtual assistant application 265 can be configured for taking and submitting online orders of the user 230. In yet another example, the service providing entity can be an offline grocery store or an offline restaurant, and the given virtual assistant application 265 can be configured for taking and submitting food orders of the user 230. Other examples of the service providing entity and associated uses of the given virtual assistant application 265 are also envisioned without departing from the scope of the present technology.

In specific non-limiting example, the given virtual assistant application 265 may be implemented as an ALISA™ virtual assistant application provided by YANDEX LLC of 16 Lev Tolstoy Street, Moscow, 119021, Russia. However, it should be noted the given virtual assistant application 265 can be implemented as any other commercial or proprietary virtual assistant application More specifically, according to certain non-limiting embodiments of the present technology, for generating the respective machine-generated utterance 270 to the given user utterance 235, the given virtual assistant application 265 can be configured to: (1) cause receiving, using the microphone of the electronic device 210, the given user utterance 235 for generating, based thereon, an audio utterance representation 245 representative of the given user utterance 235; (2) cause transmission of the audio utterance representation 245 to the server 250 for generating an textual utterance representation 255; (3) cause transmission of the textual utterance representation 255 to the second server 260 for generating, based on the textual utterance representation 255, the machine-generated utterance 270; and (4) cause transmission data indicative of the respective machine-generated utterance 270 to the electronic device 210 for reproduction thereof for the user 230.

According to certain non-limiting embodiments of the present technology, the audio utterance representation 245 can be an amplitude-time representation of the given user utterance 235, such as a representation of a digitized audio signal thereof in one of formats mentioned above. However, in other non-limiting embodiments of the present technology, the audio utterance representation can be a time-frequency representation of the given user utterance 235. In some non-limiting embodiments of the present technology, the time-frequency representation can be a respective spectrogram associated with the given user utterance 235. Generating of spectrograms is beyond the scope of the present application; however, briefly speaking, the server 250 can be configured to generate the respective spectrogram of the given user utterance 235 by applying a Fourier Transform to portions of the amplitude-time representation of the given user utterance 235 consecutively defined based on a predetermined time window. In some non-limiting embodiments of the present technology, the respective spectrogram can be converted in a mel scale. For example, the respective spectrogram can be generated as described in a co-owned United States Patent Publication No.: US 20220254333 A1, published on Aug. 11, 2022 and entitled "METHOD AND SYSTEM FOR CLASSIFYING A USER OF AN ELECTRONIC DEVICE", content of which is incorporated herein by reference in its entirety.

Further, according to certain non-limiting embodiments of the present technology, the textual utterance representation 255 is a text string representative of the given user utterance 235 which can be stored and transmitted, by the server 250, in one of text formats, such as a plain text format, as an example.

How each one of the server 250 and the second server 260 can be configured for generating the respective machine-generated utterance 270 to the given user utterance 235, will now be described with reference to FIGS. 3 to 7. It should be noted that each one of the server 250 and the second server 260 can be run by the same or different entities without departing from the scope of the present technology.

Figure 3:
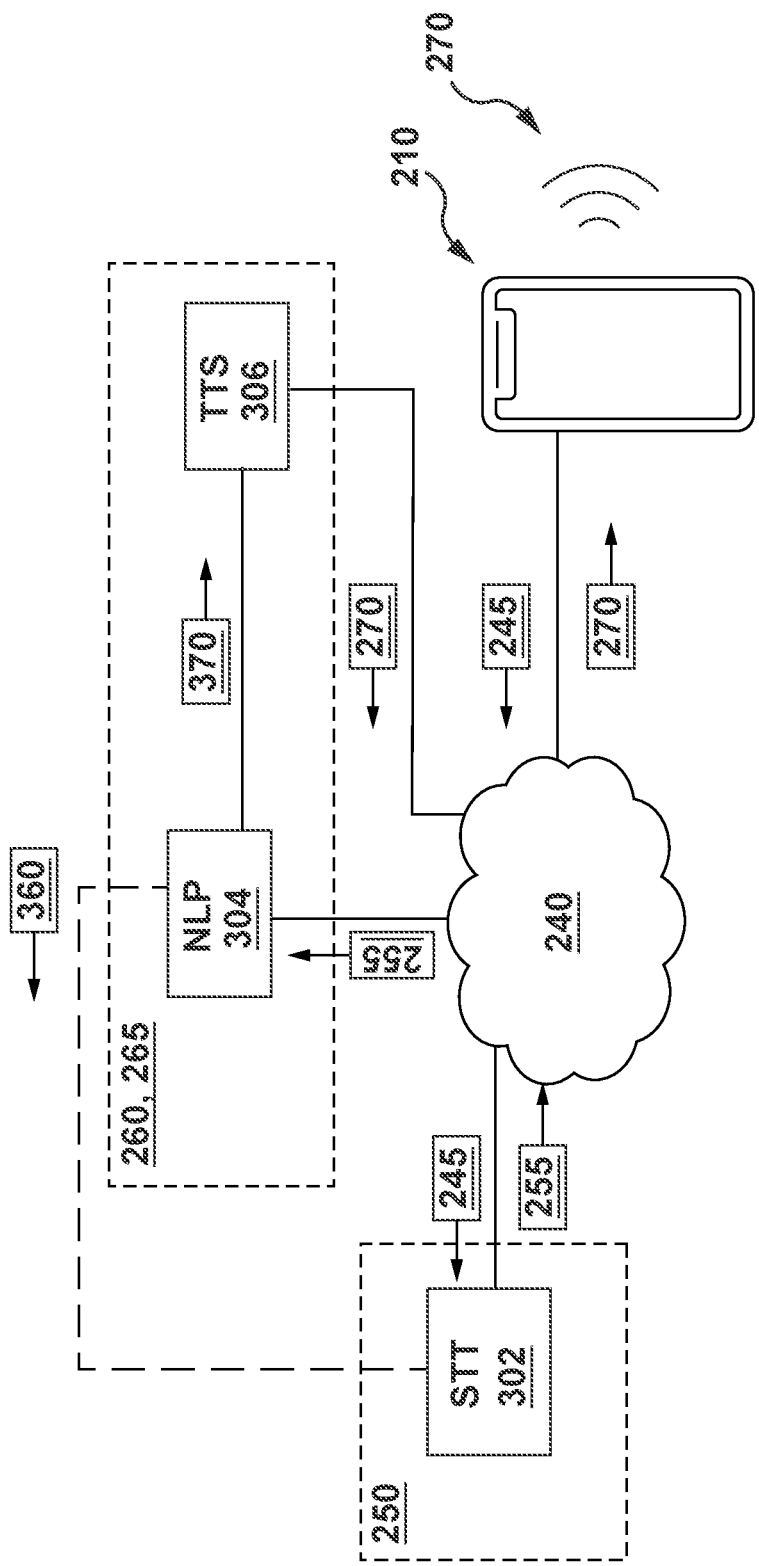
FIG. 3 depicts a schematic diagram of a process for generating, by a virtual assistant application hosted by a server present in the networked computing environment of FIG. 2, a respective voice response to a given voice utterance, in accordance with the non-limiting embodiments of the present technology.

With reference to FIG. 3, there is depicted a schematic diagram of a process for generating, by the networked computing environment 200, the respective machine-generated utterance 270 in response to receiving the given user utterance 235, in accordance with certain non-limiting embodiments of the present technology.

First, as mentioned above, the given virtual assistant application 265, can be configured to (i) cause the electronic device 210 to receive the given user utterance 235, thereby generating the audio utterance representation 245 representative thereof, and (ii) to cause the electronic device 210 to transmit the audio utterance representation 245 to the server 250 for speech recognition of the given user utterance 235 and generating the textual utterance representation 255.

To generate the textual utterance representation 255 from the audio utterance representation 245, the server 250 can be configured to host (or otherwise have access to) a Speech-To-Text (STT) model 302. An architecture and configuration of the STT model 302 for speech recognition will be described in a greater detail below with reference to FIGS. 6 and 7; however, broadly speaking, the STT model 302 is configured to process spoken human language, such as the given user utterance 235 of the user 230, to recognize therein separate words and thus generate the textual utterance representation 255, for example, a text string, such as "Hello, it's John Smith, I want to make an appointment with my family doctor," or "Hi, I'd like to order a pizza," and the like.

Further, having generated the textual utterance representation 255, in some non-limiting embodiments of the present technology, the server 250 can be configured to transmit it to the second server 260 for further natural language processing of the textual utterance representation 255.

To that end, according to certain non-limiting embodiments of the present technology, the second server 260 can be configured to host (or otherwise have access to) a Natural Language Processing (NLP) model 304, which can be configured for (1) understanding of a language of the textual utterance representation 255, that is, determining contextual and grammatical relations between words thereof; and (2) generating, based on the textual utterance representation 255, a machine-generated text string 370, which is a textual representation of the respective machine-generated utterance 270 to be outputted to the user 230. Architecture and configuration of the NLP model 304 will be described below.

Further, for generating the respective machine-generated utterance 270 for the user 230, in some non-limiting embodiments of the present technology, the virtual assistant application 265 can be configured to cause transmission of the machine-generated text string 370 to a Text-To-Speech (TTS) model 306, which can be configured to convert the machine-generated text string 370 into an instance of natural language speech and further transmit data thereof to the electronic device 210 for reproduction for the user 230. Architecture and configuration of the TTS model 306 will be described further below.

It should be expressly understood that although in the depicted embodiments of FIG. 3, the NLP model 304 and the TTS model 306 are hosted by the second server 260, in other non-limiting embodiments of the present technology, each one of these models can be hosted and hence trained and used by the server 250. In other words, the server 250 and the second server 260 can be implemented as a single server. In yet other non-limiting embodiments of the present technology, each one of the NLP model 304 and the TTS model 306 can be hosted by a distinct third-party server (not depicted) communicatively coupled to the communication network 240.

Communication Network

In some non-limiting embodiments of the present technology, the communication network 240 is the Internet. In alternative non-limiting embodiments of the present technology, the communication network 240 can be implemented as any suitable local area network (LAN), wide area network (WAN), a private communication network or the like. It should be expressly understood that implementations for the communication network are for illustration purposes only. How a respective communication link (not separately numbered) between each one of the server 250, the second server 260, the electronic device 210, and the communication network 240 is implemented will depend, inter alia, on how each one of the server 250, the second server 260, and the electronic device 210 is implemented. Merely as an example and not as a limitation, in those embodiments of the present technology where the electronic device 210 is implemented as a wireless communication device such as a smartphone, the communication link can be implemented as a wireless communication link. Examples of wireless communication links include, but are not limited to, a 3G communication network link, a 4G communication network link, and the like. The communication network 240 may also use a wireless connection with the server 250 and the second server 260.

Machine-Learning Model Architecture

Figure 4:
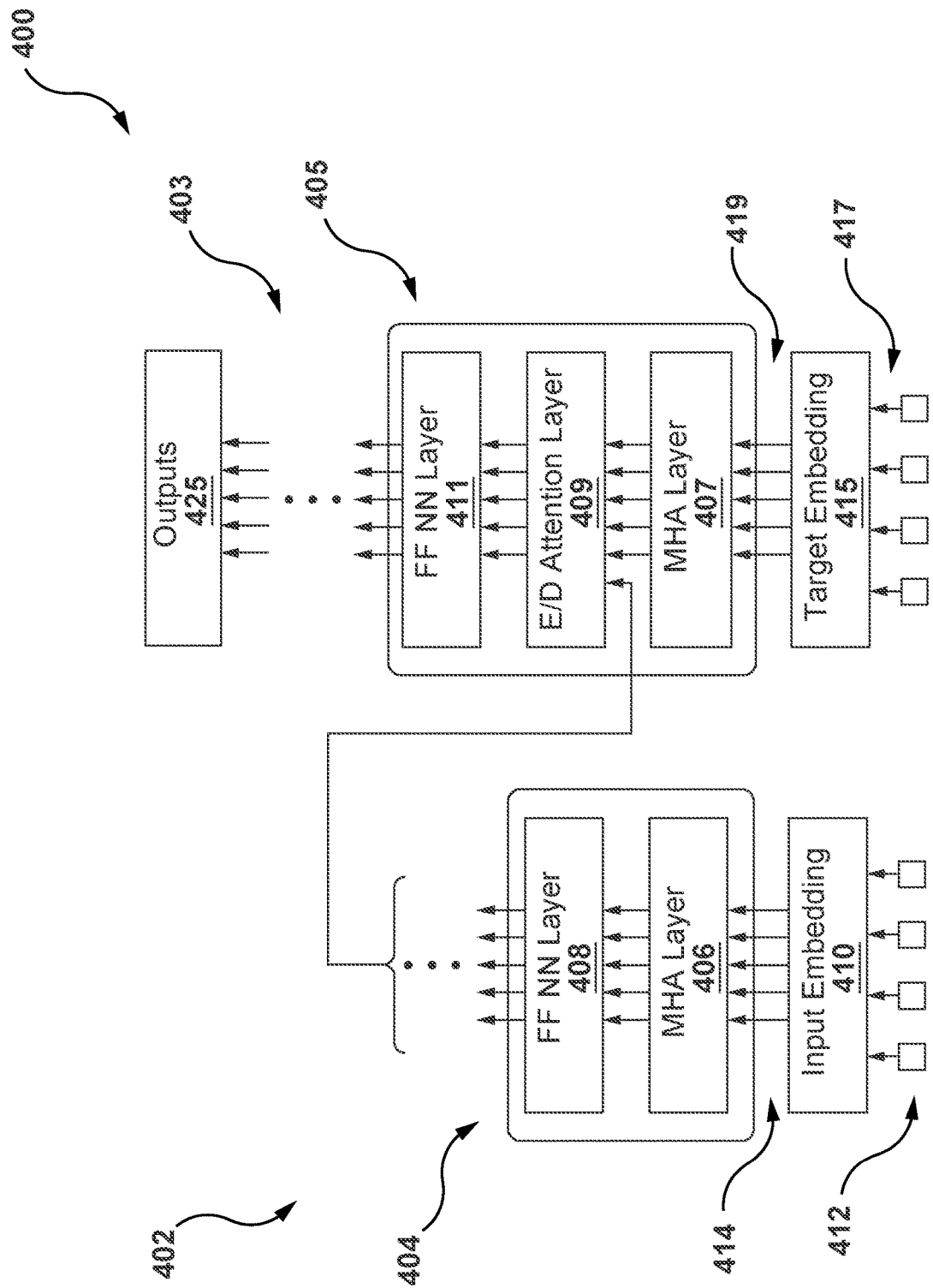
FIG. 4 depicts a schematic diagram of a machine-learning model architecture suitable for use in some non-limiting implementations of the present technology.

With reference to FIG. 4, there is depicted a machine-learning model architecture 400 suitable for use with at least some non-limiting embodiments of the present technology. The machine-learning model architecture 400 is based on a Transformer neural network model architecture as described, for example, in an article by Vaswani et al. "Attention Is All You Need," and published in the Proceedings of 31$^{st}$ Conference on Neural Information Processing Systems (NIPS 2017), the content of which is incorporated herein by reference in its entirety.

Thus, the machine-learning model architecture 400 can comprise an encoder stack of layers 402 and a decoder stack of layers 403, which can be configured to process input data 412 and target data 417 of the machine-learning model architecture 400, respectively.

Further, a given encoder block 404 of the encoder stack of layers 402 includes an encoder multi-head attention (MHA) layer 406 and an encoder feed-forward NN layer 408. The encoder MHA layer 406 includes dependencies between portions of the input data 412 provided thereto. For example, if the input data 412 includes text data, such as a text sentence, the encoder MHA layer 406 may include dependencies between words of the sentence. In another example, where the input data 412 to the encoder stack of layer 402 includes an audio signal, such as that representing a human utterance (such as the given user utterance 235 described above), the encoder MHA layer 406 may include dependencies between certain sounds and/or acoustic features of the human utterance. Such dependencies can be used by the encoder MHA layer 406 for determining contextual information of a given portion of the input data 412 to the encoder stack of layers 402 (such as that representative of a given word of the sentence or a given acoustic feature of the given user utterance 235) relative to another portion of the input data 412.

Further, the encoder feed-forward NN layer 408 is configured to transform data input thereto from the encoder MHA layer 406 into a format receivable by one or more following layers of the machine-learning model architecture 400, such as an encoder-decoder MHA layer 409, as will be described below. The encoder feed-forward NN layer 408 generally lacks dependencies of the encoder MHA layer 406, and thus the inputs to the encoder feed-forward NN layer 408 may be processed in parallel.

Further, the input data 412 to the encoder stack of layers 402 can be represented by a plurality of input vectors 414 generated by an input embedding algorithm 410. Generally speaking, the input embedding algorithm 410 is configured to generate fixed-dimensional vector representations of the input data 412 in a respective embedding space. In other words, if the input data 412 comprise data indicative of the given user utterance 235, such as the audio utterance representation 245, for example, the input embedding algorithm 410 can be configured to generate the plurality of input vectors 414, where coordinates of vectors representative of similar acoustic features of the audio utterance representation 245 (representative, for example, of similar sounding portions of the given user utterance 235) are positioned closer to each other in the respective embedding space.

Generally, the implementation of the input embedding algorithm 410 depends on a data format of the input data 412 provided thereto. However, if the input data 412 comprises human utterances, as illustrated by the example above, the input embedding algorithm 410 can be implemented as an acoustic embedding algorithm, including, without limitation, a Seq2Seq Autoencoder acoustic embedding algorithm, a Convolutional Vector Regression acoustic embedding algorithm, a Letter-ngram acoustic embedding algorithm, an LSTM-based acoustic embedding algorithm, and the like.

Thus, a given one of the plurality of vectors 414 can include numerical values, such as 468 floating point values, as an example, representative of a respective portion of the input data 412, such as a word, a portion of the given user utterance 235, and the like.

Also, the generating the plurality of input vectors 414 can further include applying a positional embedding algorithm (not depicted) configured to register positional information within portions of the input data 412. For example, if the input data 412 includes a text sentence, the positional embedding algorithm can be configured to generate a vector indicative of positional information amongst words in that text sentence. In another example, where the input data 412 are representative of the given user utterance 235, the positional embedding algorithm can be configured to register positional information of acoustic features associated therewith. In other words, the positional embedding algorithm can be configured to generate the vector retaining contextual information within the input data 412, which can further be added to the plurality of input vectors 414. It is not limited how the positional embedding algorithm is implemented; and may include, without limitation, a sinusoid positional embedding algorithm, a frame stacking positional embedding algorithm, and a convolutional positional embedding algorithm, as an example.

It should be noted that the encoder stack of layers 402 can include multiple encoder blocks, such as 6 or 12, for example, implemented similarly to the given encoder block 404.

Further, a given decoder block 405 of the decoder stack of layers 403 of the machine-learning model architecture 400 also includes (i) a decoder MHA layer 407; and (ii) a decoder feed-forward NN layer 411, which can generally be implemented in a similar fashion to the encoder MHA layer 406 and the encoder feed-forward NN layer 408, respectively. However, the architecture of the given decoder block 405 differs from that of the given encoder block 404 in that that the given decoder block 405 additionally includes the encoder-decoder MHA layer 409. The encoder-decoder MHA layer 409 is configured to (i) receive input vectors from the encoder stack of layers 402 and from the decoder MHA layer 407; and thus (ii) determine, during a training process, as will become apparent from the description provided below, dependencies between the input data 412 and the target data 417 (such as text data, for example) of the machine-learning model architecture 400 input to the decoder stack of layers 403. In other words, outputs of the encoder-decoder MHA layer 409 are attention vectors including data indicative of relationships between respective portions of the input data 412 and the target data 417.

Similar to the input data 412, for feeding the target data 417 to the given decoder block 405, a target embedding algorithm 415 can be applied to the target data 417 for generating a plurality of target vectors 419 comprising numerical representations of respective portions of the target data 417. Similar to the input embedding algorithm, the target embedding algorithm 415 can be configured to generate mappings of the target data 417 in the respective embedding space. For example, if the target data 417 comprise text data, such as a text sentence, the target embedding algorithm 415 can be configured to generate the plurality of target vectors 419, where coordinates of vectors representative of words of the text sentence similar in meaning are positioned closer to each other in the respective embedding space. Thus, the target embedding algorithm 415 can be implemented as a text embedding algorithm including, without limitation, one of a Word2Vec text embedding algorithm, a GloVe text embedding algorithm, and the like.

As it can be appreciated, the target embedding algorithm 415 can be implemented in a similar fashion to the input embedding algorithm 410. Additionally, the positional algorithm can be applied to the plurality of target vectors 419 for capturing positional data amongst portions of the target data 417, as described above with respect to the plurality of input vectors 414.

As will become apparent from the description provided hereinbelow, the machine-learning model architecture 400 can be configured to receive the input data 412 and the target data 417 from a digital object, such as a given STT training digital object 640 as will be described with reference to FIG. 6, as an example.

Similarly, it should be noted that the decoder stack of layers 403 can include multiple decoder blocks, such as 6 or 12, for example, implemented similarly to the given decoder block 405. Also, as it can be appreciated, after the training the machine-learning model architecture 400, each block of the encoder stack of layers 402 and the decoder stack of layers 403 will have different weights contributing to the generation of the output data 425. For adjusting the weights during the training process, a backpropagation algorithm can be applied to the machine-learning model architecture 400, and a difference between the input data 412 and the output data 425 can be determined and further minimized. Such difference can be expressed by a loss function, such as a Cross-Entropy Loss Function.

It should be expressly understood that other implementations of the loss function are also envisioned by the non-limiting embodiments of the present technology and may include, by way of example, and not as a limitation, a Mean Squared Error Loss function, a Huber Loss function, a Hinge Loss function, and others.

The output data 425 of the machine-learning model architecture 400 can include an output vector corresponding to a given one of the plurality of input vectors 414. For example, as will become apparent from the description below, in those embodiments, where the input data 412 to the machine-learning model architecture 400 includes the audio utterance representation 245 of the given user utterance 235, the output vector can include probabilities indicative of a respective portion of the textual utterance representation 255.

It will be understood that the architecture of the machine-learning model architecture 400 described with reference to FIG. 4 has been simplified for ease of understanding; and an actual implementation of the machine-learning model architecture 400 may include additional layers and/or blocks, as described, for example, in the Vaswani et al. article referenced above. For example, in some implementations of the machine-learning model architecture 400, each of the given encoder block 404 and the given decoder bock 405 may also include layer normalization operations. Additionally, generating the output data 425 may include applying a softmax normalization function at an output of the decoder stack of layers 403, and so on. One of ordinary skill in the art would understand that these operations are commonly used in neural networks and deep learning models such the machine-learning model architecture 400.

NLP Model

In the context of the present specification, an NLP model, such as the NLP model 304 described below, is a machine-learning model trained to read, understand, and produce instances of natural language. In other words, the NLP model 304 can be said to execute two distinct processes: (i) a natural language understanding (NLU) process, for example, for understanding the textual utterance representation 255 generated by the STT model 302 converting the textual utterance representation 255 in structured data; and (ii) a natural language generation (NLG) process for generating, based on the structured data, the machine-generated text string 370.

The machine-generated text string 370 can thus be indicative, for example, of a next conversation line of the virtual assistant application 265, responsive to the given user utterance 235. For example, if the given user utterance 235 reads "Hello, it's John Smith, I want to make an appointment with my family doctor,", the machine-generated text string 370 can be indicative of the following phrase: "Sure! Can I have your medical insurance card number?"

In some non-limiting embodiments of the present technology, the NLP model 304 can be implemented based on a neural network (NN), such as a Long short-term memory NN or a recurrent NN. However, according to certain non-limiting embodiments of the present technology, the NLP model 304 can be implemented as a Transformer-based NN model. To that end, the NLP model 304 can include some or all the components of the machine-learning model architecture 400 described above.

More specifically, in some non-limiting embodiments of the present technology, the NLP model 304 can also include the encoder stack of layers 402 and the decoder stack of layers 403 including multiple encoder and decoder blocks; however, respective numbers of such blocks in each of the encoder stack of layers 402 and the decoder stack of layers 403 can be different from those in the machine-learning model architecture 400.

For example, in some non-limiting embodiments of the present technology, the NLP model 304 can include one encoder block and thirteen decoder blocks implemented similarly to the given encoder block 404 and the given decoder block 405, respectively, as described above. In other non-limiting embodiments of the present technology, the NLP model 304 can include no encoder blocks and multiple decoder blocks, such as 6, 12, or 96, as an example, in which case the NLP model 304 can be referred to as a Generative Pre-trained Transformer (GPT) model. By contrast, in yet other non-limiting embodiments of the present technology, the NLP model 304 can include only encoder blocks, such as 12, 24, or 36, as an example, and no decoder blocks, in which case the NLP model 304 can be referred to as a Bidirectional Encoder Representations from Transformers (BERT) model.

Other configurations of the encoder stack of layers 402 and the decoder stack of layers 403 for implementing the NLP model 304 are also envisioned without departing from the scope of the present technology.

Further, to train the NLP model 304 to generate machine-generated text strings in response to textual utterance representations generated by the STT model 302, such as the machine-generated text string 370 to the textual utterance representation 255 of the given user utterance 235, the second server 260 can be configured to feed thereto an NLP training set of data including a plurality of NLP training digital objects.

According to certain non-limiting embodiments of the present technology, a given NLP training digital object of the plurality of NLP training digital objects can include (i) a first user-generated text string; and (2) a second user-generated text string responsive to the first user-generated text string.

To that end, for example, the given NLP training digital object can be mined on the Internet, from public domain social media conversations, such as comments or posts on a given social network website or discussions on a given forum website. In another example, the first user-generated text string and the second user-generated text string can be generated based on conversations between various technical support services, such as that of service providing entity described above, and their customers.

Further, according to certain non-limiting embodiments of the present technology, the second server 260 can be configured to feed (i) the first user-generated text string to the encoder stack of layers 402; and (ii) the second user-generated text string to the decoder stack of layers 403, as described above. By so doing, the second server 260 can be configured to feed the plurality of NLP training digital objects including, for example, thousands or hundreds of thousands similar training NLP digital objects, to the NLP model 304, thereby training the NLP model 304 to generate the output data 425 including probability distribution vectors for words of an in-use machine-generated text string responsive to an in-use textual representation of a user utterance.

Further, using the backpropagation algorithm, the loss function representative of a difference between the input data 412 and the output data 425 can be determined, and by minimizing the loss function, the second server 260 can be configured to determine weights for nodes of the NLP model 304. More information on training the NLP model 304 can be obtained, for example, in an article "Towards a Human-like Open Domain Chatbot", written by Adiwardana et al., and published by Google Research, content of which is incorporated herein by reference in its entirety.

In those embodiments where the NLP model 304 includes only the encoder stack of layers 402 or only the decoder stack of layers 403, the NLP model 304 can be, first, pre-trained based on a more generic training set of data; and further fine-tuned based on the NLP training set of data described above as explained in detail, for example, in an article "Language Models are Few-Shot Learners", written by Brown et al. and published by OpenAI, content of which is incorporated herein by reference in its entirety.

Thus, the second server 260 can be configured to train the NLP model 304 to generate the machine-generated text string 370 in response to the textual utterance representation 255 of the given user utterance 235.

TTS Model

As mentioned hereinabove with reference to FIG. 3, after receiving, from the NLP model 304, the machine-generated text string 370, the virtual assistant application 265 can be configured to transmit the machine-generated text string 370 to the TTS model 306 for generation of a machine-generated audio signal indicative of the respective machine-generated utterance 270 to the given user utterance 235.

Broadly speaking, the TTS model 306, as used herein, is a machine-learning model configured to convert natural language instances in a form of text, as an example, into speech. It is not limited how the TTS model 306 can be implemented, which may include, without limitation, a WaveNet TTS model, a Deep Voice TTS model, a Tacotron TTS model, and the like.

However, according to certain non-limiting embodiments of the present technology, the TTS model 306 can be implemented as a Transformer-based NN model and thus include some or all components of the machine-learning model architecture 400 described above with reference to FIG. 4.

Figure 5:
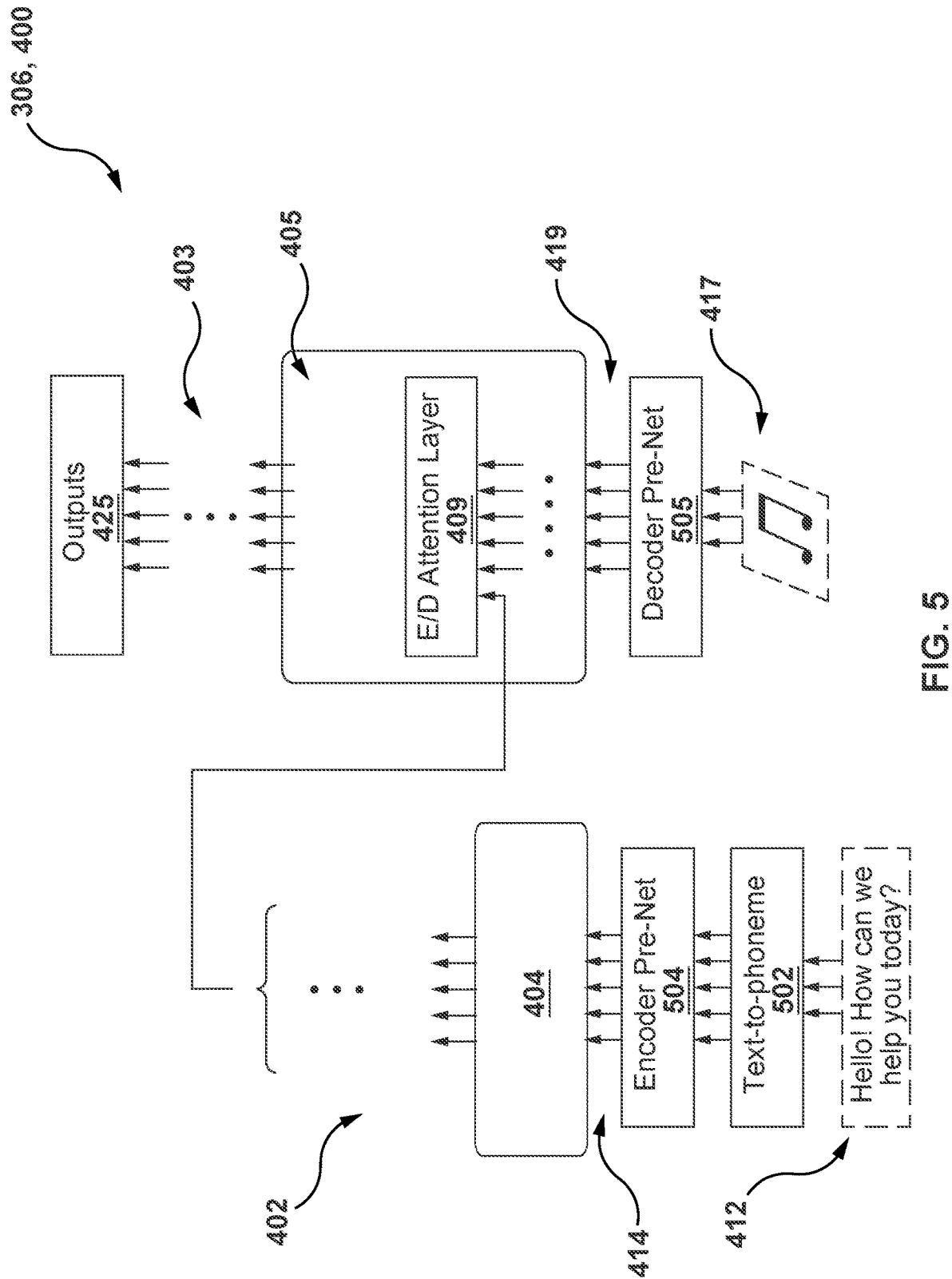
FIG. 5 depicts a schematic diagram of a Text-To-Speech (TTS) model implemented based on the machine-learning model architecture of FIG. 4 and hosted by the server present in the networked computing environment of FIG. 2 to generate the respective voice response to the given user utterance, in accordance with the non-limiting embodiments of the present technology.

With reference to FIG. 5, there is depicted a schematic diagram of the TTS model 306 based on the machine-learning model architecture 400 of FIG. 4, in accordance with certain non-limiting embodiments of the present technology. Thus, as will become apparent from the description below, the input data 412 to the TTS model 306 may include text strings and the target data 417 may include audio representations of user utterances corresponding to the text strings of the input data 412.

To that end, in some non-limiting embodiments of the present technology, the TTS model 306 can have additional components for processing the input data 412 and the target data 417. More specifically, for inputting the input data 412, the TTS model 306 can include a Text-To-Phoneme conversion algorithm 502 configured to generate a phonetic representation of a given input string, such as words or sentences, as an example. For example, a phonetic representation of a given word may include a respective phonetic transcription thereof according to the International Phonetic Alphabet (IPA).

Further, for generating the plurality of input vectors 414 representative of embeddings of the phonetic representation of the given input text string in the respective embedding space, as described above, according to certain non-limiting embodiments of the present technology, the TTS model 306 include an additional NN, an Encoder Pre-net 504. In some non-limiting embodiments of the present technology, the Encoder Pre-net 504 can be implemented as a convolutional NN (CNN) having a predetermined number of layers, such as 3, as an example.

Further, in some non-limiting embodiments of the present technology, an audio representation of a given user utterance input to the TTS model 306 as part of the target data 417 may be generated in a similar fashion to the audio utterance representation 245 as described above with reference to FIG. 2. To that end, in some non-limiting embodiments of the present technology, the audio representation for the TTS model 306 can comprise a respective mel spectrogram associated with the given user utterance, as an example.

Further, for receiving the audio representation by the decoder stack of layers 403, in some non-limiting embodiments of the present technology, the TTS model 306 can further include a yet additional NN configured to generate the plurality of target vectors 419 based on the audio representations of the given user utterance. More specifically, this NN can have a predetermined number, such as 2, of fully connected layers, each including, for example, 256 hidden nodes with a ReLU activation function.

Further, according to certain non-limiting embodiments of the present technology, the TTS model 306 can be trained, such as by the second server 260, to determine correspondences between phonemes of words or phrases of the input data 412 and audio representations of user utterances of the target data 417. By doing so, the second server 260 can be configured to train the TTS model 306 to generate machine-generated audio signals indicative of machine-generated speech utterances to be provided in response to receiving respective text string, such as the machine-generated text string 370.

To do so, the second server 260 can be configured to train the TTS model 306 based on a TTS training set of data including a plurality of TTS training digital objects. More specifically, according to certain non-limiting embodiments of the present technology, a given TTS training digital object of the plurality of TTS training digital objects can include: (1) a given training text string; and (2) a respective training audio representation, such as a mel spectrogram as described above, of a user utterance produced by a training user uttering the given training text string.

In some non-limiting embodiments of the present technology, the given training text string can be pre-prepared for the training user to utter it to produce the respective audio representation associated therewith. For example, the given training text string can read "Hello! You have reached the office of Doctor House. How can we help you today?", and the training user can further utter this given training text string and record their utterance using an electronic device similar to the electronic device 210 described above. Further, based on the recording of the user utterance, the second server 260 can be configured to generate the respective training audio representation associated with the given training text string.

However, in other non-limiting embodiments of the present technology, the second server 260 can be configured to receive (1) a TTS training audio signal representative, for example, pre-recorded speech of a relatively long duration, such as 25 hours, as an example; and (2) and an associated TTS training textual representation of the pre-recorded speech represented by the TTS training audio signal. Further, the second server 260 can be configured to (1) break the TTS training audio signal into a plurality of portions, for example, of equal length, such as 10 seconds; (2) generate, for a given portion of the TTS training audio signal, the respective training audio representation thereof; (3) define respective portions within the TTS training textual representation of the pre-recorded speech corresponding to the plurality of portions of the TTS training audio signal; and (4) assemble the given TTS training digital object to include the given training text string being a given portion of the TTS training textual representation of the pre-recorded speech and the respective training audio representation thereof.

Thus, having generated (or otherwise received) the TTS training set of data as described above, the second server 260 can be configured to train the TTS model 306 to generate, based on the machine-generated text string 370, the machine-generated audio signal indicative of the machine-generated utterance 270. More specifically, as it can be appreciated from the above, first, the second server 260 can be configured to feed the given training text string, via the Text-To-Phoneme conversion algorithm 502 and further the Encoder Pre-net 506, as described above to the encoder stack of layers 402. Second, the second server 260 can be configured to feed the respective training audio representation associated with the given text string, via the Decoder Pre-net 505, as described above, to the decoder stack of layers 403. In so doing, the second server 260 can be configured to input each one of the plurality of TTS training digital objects.

Further, as described above, using the backpropagation algorithm and minimizing the loss function indicative of a difference between the input data 412 and the output data 425, the second server 260 can be configured to train the TTS model 306 to generate, in response to a given in-use text string, such as the machine-generated text string 370, the output data 425 including probability distribution vectors for portions of machine-generated audio signal corresponding to the machine-generated text string 370. Further, based on the respective in-use audio representation, the second server 260 can be configured to generate the machine-generated audio signal representative of the respective machine-generated utterance 270 of the virtual assistant application 265 to the given user utterance 235.

Additional details on implementing the TTS model 306, according to some non-limiting embodiments of the present technology, can be found in an article "Close to Human Quality TTS with Transformer", written by Li et al. and published by University of Electronic Science and Technology of China, content of which is incorporated herein by reference in its entirety. Furthermore, additional details on the TTS model 306, that can be used for implementing some non-limiting embodiments of the present technology, can be found in an article "FastSpeech 2: Fast and High-Quality End-to-End Text to Speech", authored by Yi Ren et al. and published by Zhejiang University, Microsoft Research Asia and Microsoft Azure Speech, content of which is incorporated herein by reference in its entirety. Furthermore, additional details on the TTS model 306, that can be used for implementing some non-limiting embodiments of the present technology, can be found in an article "Fastpitch: parallel text-to-speech with pitch prediction", authored by Adrian Lancuck and published by NVIDIA Corporation, content of which is incorporated herein by reference in its entirety.

Thus, referring back to FIG. 3, the networked computing environment 200 can be configured to generate the respective machine-generated utterance 270 for transmission thereof to the electronic device 210 in response to receiving the given user utterance 235.

However, developers of the present technology have appreciated that quality and relevance of the respective machine-generated utterance 270 of the virtual assistant application 265 can be increased via increasing accuracy of generating, by the STT model 302, the textual utterance representation 255. It should be noted that the second server 260 makes use of outputs of the STT model 302 during processing performed by the NLP model 304 and the TTS model 306. As a result, increasing the quality of the outputs generated by the STT model 302 may also ameliorate the performance of other downstream components of the networked computing environment 200 used by the voice assistant application 265 to generate machine-generated utterances for the user 230.

In this regard, the developers have realized that the STT model 302 could generate the textual utterance representation 255 more accurately if it were configured to take into account a previous machine-generated text string 360 of the NLP model 304 as a context for the audio utterance representation 245 of the user utterance 235. In some non-limiting embodiments of the present technology, the previous machine-generated text string 360 can be generated, by the NLP model 304, for a previous respective machine-generated utterance, generated by the TTS model 306 as described above, in response to which the user 230 has provided the given user utterance 235.

Thus, the developers have devised methods and systems described herein allowing the STT model 302 to consider the previous machine-generated text string 360 as the context for the given user utterance 235 to generate the textual utterance representation 255 thereof further used for generating the machine-generated utterance 270. By doing so, the present methods and systems may allow increasing the accuracy of the STT model 302, for example, by resolving an issue of lexical ambiguity when processing the audio utterance representation 245 of the given user utterance 235.

For example, if in the given user utterance 235 the user 230 provides their last name, such as "It's Wordsworth", without "knowing" the context, the STT model 302 can generate the textual utterance representation 255 being "It's words worth"—not enabled to "understand" that it is the last name which should be represented as a single word. However, feeding back the previous machine-generated text string 360, used for generating the previous respective machine-generated utterance for the user 230, such as "Can I have your last name, please?", to the STT model 302 may provide the proper context for the given user utterance 235 enabling the STT model 302 to recognize a known last name "Wordsworth". In another example, without providing a proper context to the STT model 302, based on the given user utterance 235 including an indication of user address of the user 230, such as "4245, Bellechasse", the STT model 302 may be configured to generate the textual utterance representation 255 reading "4245 belle chasse", that is, not recognizing a popular French toponym "Bellechasse", which, in the present example, is rereferring to a street name.

Thus, by doing so, the methods and systems described herein may allow improving accuracy of speech recognition provided by the STT model 302, which further allows generating more relevant voice responses for the user 230 to their utterances provided to the given virtual assistant application 265, which may thus result in a more satisfactory interaction of the user 230 with the given virtual assistant application 265.

The architecture and configuration of the STT model 302, in accordance with certain non-limiting embodiments of the present technology, will now be described with reference to FIGS. 6 to 7.

STT Model

As mentioned hereinabove, according to certain non-limiting embodiments of the present technology, the STT model 302 can be implemented as a machine-learning model. In some non-limiting embodiments of the present technology, the machine-learning model comprise a neural network (NN)-based model. Non-limiting examples of NN-based models that can be used for implementation of the present technology may include a recurrent NN (RNN)-based model or a Long short-term memory NN-based model, as an example.

In some non-limiting embodiments of the present technology, the STT model 302 can be implemented as a Transformer-based NN model. To that end, the STT model 302 can include some or all of the components of the machine-learning model architecture 400 described above with reference to FIG. 4.

However, according to certain non-limiting embodiments of the present technology, the STT model 302 may have additional components. With reference to FIG. 6, there is depicted a schematic diagram of the STT model 302 implemented in accordance with certain non-limiting embodiments of the present technology.

According to certain non-limiting embodiments of the present technology, the STT model 302 may have an STT decoder stack of layers 603 whose a given STT decoder block 605 has a different architecture from that of the given decoder block 405 of the machine-learning model architecture 400. More specifically, aside from the components of the given decoder block 405 described above, the given STT decoder block 605 may include an additional MHA layer 607 for receiving additional input data 621. In some non-limiting embodiments of the present technology, the additional input data 621 may be used for providing additional context to the input data 412 and the target data 417, as will be described in greater detail below. Thus, in some non-limiting embodiments of the present technology, the additional MHA layer 607 can be configured to determine dependencies between respective portions of the input data 412, the target data 417, and the additional input data 621.

As it can be appreciated, to input the additional input data 621 in the given STT decoder block 605, the server 250 can be configured to apply a second input embedding algorithm 610, implemented similarly to one of the input embedding algorithm 410 and the target embedding algorithm 415. Further, as described above with respect to the input data 412 and the target data 417, the server 250 can be configured to apply, to the additional input data 621, the positional embedding algorithm (not depicted) configured to generate a vector indicative of positional information within portions of provided data.

Similar to the examples provided above with respect to training the NLP model 304 and the TTS model 306, the server 250 can be configured to receive the input data 412, the target data 417, and the additional input data 621 for input thereof to the STT model 302 from a respective digital object, such as the given STT training digital object 640, as will now be described.

Thus, according to certain non-limiting embodiments of the present technology, for using the STT model 302 to generate textual utterance representations of input audio representations of human utterances, such as the textual utterance representation 255, the server 250 can be configured to execute two respective processes in respect of STT model 302. A first process of the two processes is a training process, where the server 250 is configured to train the STT model 302, based on a training set of data, to generate the textual utterance representation 255, which will be discussed below. A second process is an in-use process, where the server 250 is configured to apply the so-trained STT model 302 to input audio representations, which will be described, in accordance with certain non-limiting embodiments of the present technology, further below.

Training Process

According to certain non-limiting embodiments of the present technology, the server 250 can be configured to train the STT model 302 based on a STT training set of data including a plurality of STT training digital objects generated, by the server 250, using training utterances of training users.

Figure 6:
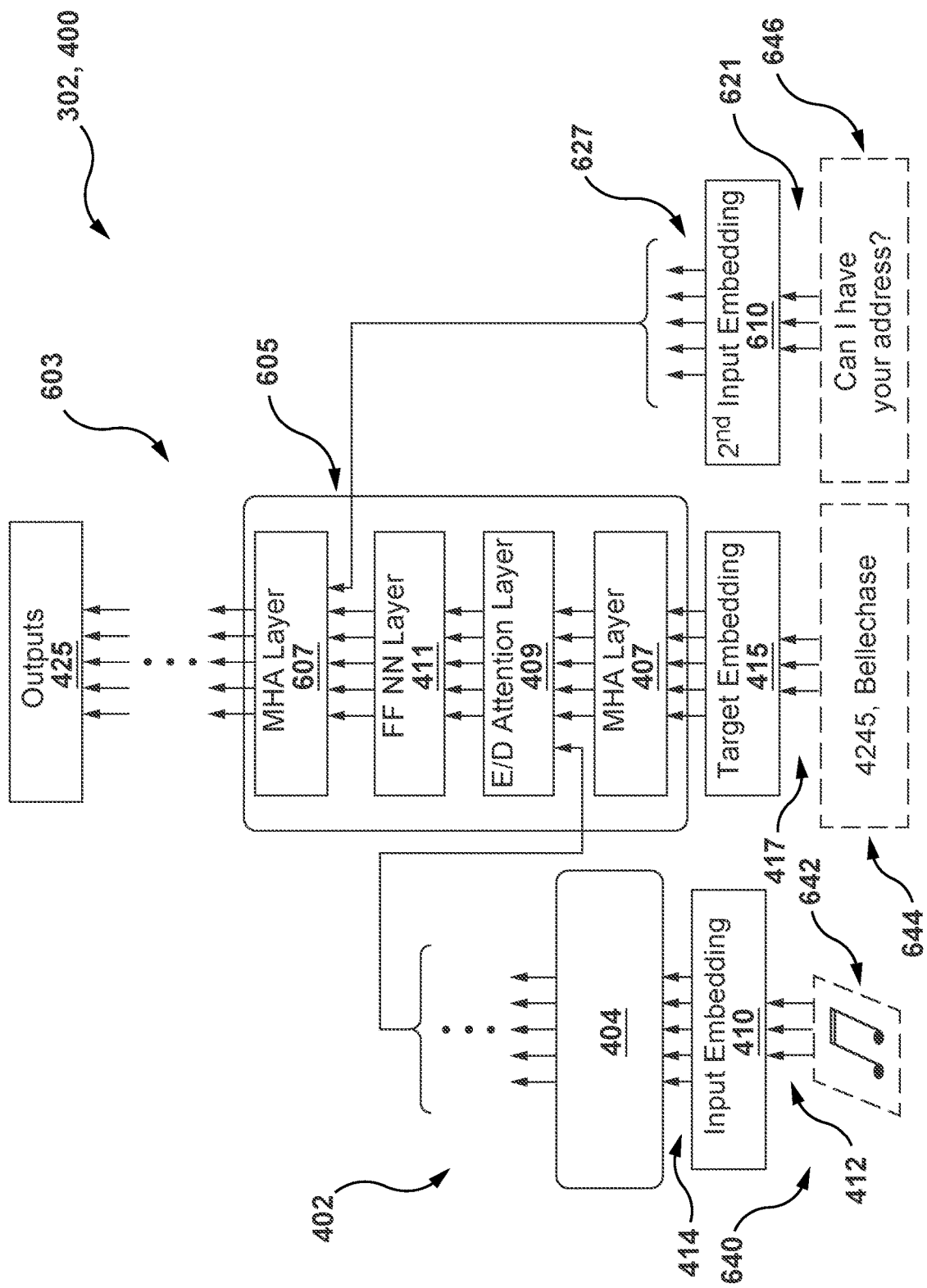
FIG. 6 depicts a schematic diagram of a Speech-To-Text (STT) model implemented based on the machine-learning model architecture of FIG. 4 during a training process thereof, by the server present in the networked computing environment of FIG. 2, to generate a textual utterance representation of the given user utterance for generating, by the TTS model, the respective voice response thereto, in accordance with the non-limiting embodiments of the present technology.

More specifically, with continued reference to FIG. 6, in some non-limiting embodiments of the present technology, the given STT training digital object 640 of the plurality of STT training digital objects can include (i) a training audio utterance representation 642, generated based on a given training user utterance of a given training user, in a similar fashion as described above with respect to generating the audio utterance representation 245; and (ii) a training textual utterance representation 644, generated, for example, manually (such as typed in), by the given training user during the generation of the given STT training digital object 640. In additional non-limiting embodiments of the present technology, the training textual utterance representation 644 can be pre-generated for further provision thereof to the given training user that would then produce the given training utterance based on the training textual utterance representation 644.

In yet other non-limiting embodiments of the present technology, the server 250 can be configured to generate the given STT training digital object 640 based on pre-recorded speech as described above with respect to the training of the TTS model 306.

Further, in accordance with certain non-limiting embodiments of the present technology, the given STT training digital object 640 can also include (iii) a training machine-generated text string 646, in response to receiving which at least one of the training audio utterance representation 642 and the training textual utterance representation 644 have been generated. Referring back to one of examples of lexical ambiguity provided above, if the training audio utterance representation 642 is indicative of the given training user utterance "4245, Bellechasse", which is further reflected in the training textual utterance representation 644, the training machine-generated text string 646 may be indicative of a question "Can I have your address?". Thus, the training machine-generated text string 646 can be used for providing a context to the given training user utterance represented by the training audio utterance representation 642 and the training textual utterance representation 644. In some non-limiting embodiments of the present technology, the training machine-generated text string 646 can be generated, for example, by the NLP model 304 (or otherwise another model similar thereto) in response to receiving a previous training user utterance, as described above.

Further, as described above, for feeding the given STT training digital object 640 to the STT model 302, the server 250 can be configured to convert each one of the training audio utterance representation 642, the training textual utterance representation 644, and the training machine-generated text string 646 into a respective vector representation thereof. More specifically, the server 250 can be configured to apply the input embedding algorithm 410 to the training audio utterance representation 642 to generate the plurality of input vectors 414, as described above. Similarly, the server 250 can be configured to apply the target embedding algorithm 415 to the training textual utterance representation 644 to generate the plurality of target vectors 419. Finally, the server 250 can be configured to apply the second input embedding algorithm 610 to the training machine-generated text string 646 to generate a plurality of additional input vectors 627.

Further, according to certain non-limiting embodiments of the present technology, the server 250 can be configured to feed (i) the plurality of input vectors 414 representative of the training audio utterance representation 642 to the encoder stack of layers 402 of the STT model 302, such as to the given encoder block 404; (ii) the plurality of target vectors 419 representative of the training textual utterance representation 644 to the STT decoder stack of layers 603 of the STT model 302, such as to the given STT decoder block 605; and (iii) the plurality of additional input vectors 627 representative of the training machine-generated text string 646 also to the given STT decoder block 605. As mentioned above, in some non-limiting embodiments of the present technology, the server 250 can be configured to feed the plurality of target vectors 419 and the plurality of additional input vectors 627 to different MHA layers of the given STT decoder block 605, that is, to the decoder MHA layer 407 and the additional MHA layer 607 thereof, respectively.

Thus, by so doing, the server 250 can be configured to provide the plurality of STT training digital objects, including, for example, thousands or hundreds of thousands of STT training digital objects similar to the given STT training digital object 640, to the STT model 302. Further, as mentioned above, the server 250 can be configured to adjust initial weights of nodes of each one of the encoder stack of layers 402 and the STT decoder stack of layers 603 by using the backpropagation algorithm and minimizing the loss function.

Thus, the server 250 can be configured to train the STT model 302 to generate textual utterance representations of human utterances based on respective audio utterance representations thereof, such as the textual utterance representation 255.

In-Use Process

According to certain non-limiting embodiments of the present technology, during the in-use process, the server 250 can be configured to user the so trained STT model 302 to recognize human utterances. With reference to FIG. 7, there is depicted a schematic diagram of the STT model 302 depicted in FIG. 6 executed, by the server 250, during the in-use process, in accordance with certain non-limiting embodiments of the present technology.

More specifically, the server 250 can be configured to receive the audio utterance representation 245 of the given user utterance 235 received from the user 230. Further, the server 250 can be configured to apply the input embedding algorithm 410 to the audio utterance representation 245 to generate the plurality of input vectors 414 representative thereof for feeding to the encoder stack of layers 402 of the STT model 302. Further, the server 250 can be configured to receive, from the NLP model 304, the previous machine-generated text string 360, which has been used for generating, by the TTS model 306, the previous respective machine-generated utterance, in response to which the user 230 has provided the given user utterance 235. Thus, according to certain non-limiting embodiments of the present technology, the server 250 can be configured to apply the second input embedding algorithm 610 to the previous machine-generated text string 360 to generate the plurality of additional input vectors 627. Further, the server 250 can be configured to feed the so generated plurality of additional input vectors 627 representative of the previous machine-generated text string 360 to the additional MHA layer 607 of the given STT decoder block 605 the STT model 302.

Thus, in some non-limiting embodiments of the present technology, in response to receiving the plurality of input vectors 414 and the plurality of additional input vectors 627, the STT model 302 can be configured to generate the output data 425 including probability distribution vectors indicative of the textual utterance representation 255 of the given user utterance 235.

Thus, by executing the so trained STT model 302 and providing thereto previous machine-generated text string used for generating, by the TTS model 306, respective previous voice responses of the virtual assistant application 265, the server 250 can be configured to provide the context to each user utterance of the user 230 allowing improving quality of generating, by the STT model 302, respective textual utterance representations, for example, by resolving lexical ambiguity issues, as described above.

For example, for each follow-up user utterance of the given user utterance 235, the server 250 can be configured to provide to the STT model 302, a respective previous machine-generated text string previously outputted by the NLP model 304 for the TTS model 306 to generate a respective previous voice response for the virtual assistant application 265, as a context for a given follow-up user utterance. By so doing, the server 250 can be configured to improve accuracy speech recondition provided by the STT model 302, which may further translate in providing, by the virtual assistant application 265, more expected and relevant voice responses to the user 230, thereby ameliorating the user experience thereof from interacting with the virtual assistant application 265

Method

Figure 8:
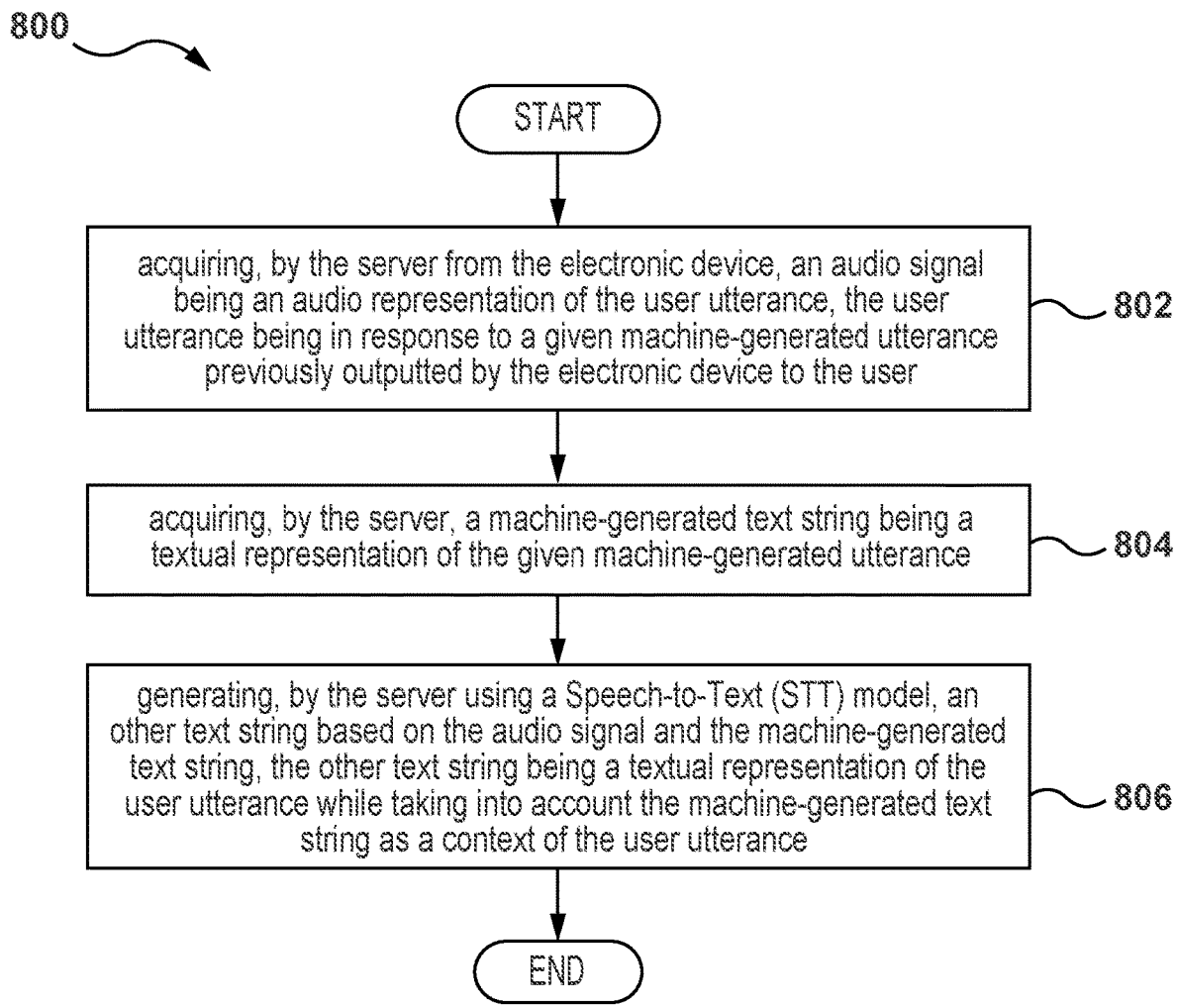
FIG. 8 depicts a flow chart of a method for generating, by the server present in the networked computing environment of FIG. 2, the textual utterance representation of the given user utterance, in accordance with the non-limiting embodiments of the present technology.

Given the architecture and the examples provided hereinabove, it is possible to execute a method for generating a textual representation of a user utterance, such as the textual utterance representation 255 of the given user utterance 235. With reference now to FIG. 8, there is depicted a flowchart of a method 800, according to the non-limiting embodiments of the present technology. The method 800 can be executed by the server 250.

STEP 802: ACQUIRING, BY THE SERVER FROM THE ELECTRONIC DEVICE, AN AUDIO SIGNAL BEING AN AUDIO REPRESENTATION OF THE USER UTTERANCE, THE USER UTTERANCE BEING IN RESPONSE TO A GIVEN MACHINE-GENERATED UTTERANCE PREVIOUSLY OUTPUTTED BY THE ELECTRONIC DEVICE TO THE USER

According to certain non-limiting embodiments of the present technology, the method 800 commences at step 802 with the server 250 being configured to acquire an audio representation of the given user utterance 235 of the user 230, such as the audio utterance representation 245 as described above with reference to FIG. 3.

As described above, the user 230 may provide the given user utterance 235 during their interaction with the virtual assistant application 265 run by the second server 260, in response to the previous respective machine-generated utterance generated by the TTS model 306 therefor.

The method 800 thus advances to step 804.

STEP 804: ACQUIRING, BY THE SERVER, A MACHINE-GENERATED TEXT STRING BEING A TEXTUAL REPRESENTATION OF THE GIVEN MACHINE-GENERATED UTTERANCE

At step 804, the server 250 can be configured to acquire, via the communication network 240, from the NLP model 304 hosted by the second server 260, the previous machine-generated text string 360 used for generating the previous respective machine-generated utterance in response to which the user 230 has provided the given user utterance 235, as described with reference to FIG. 7.

Figure 7:
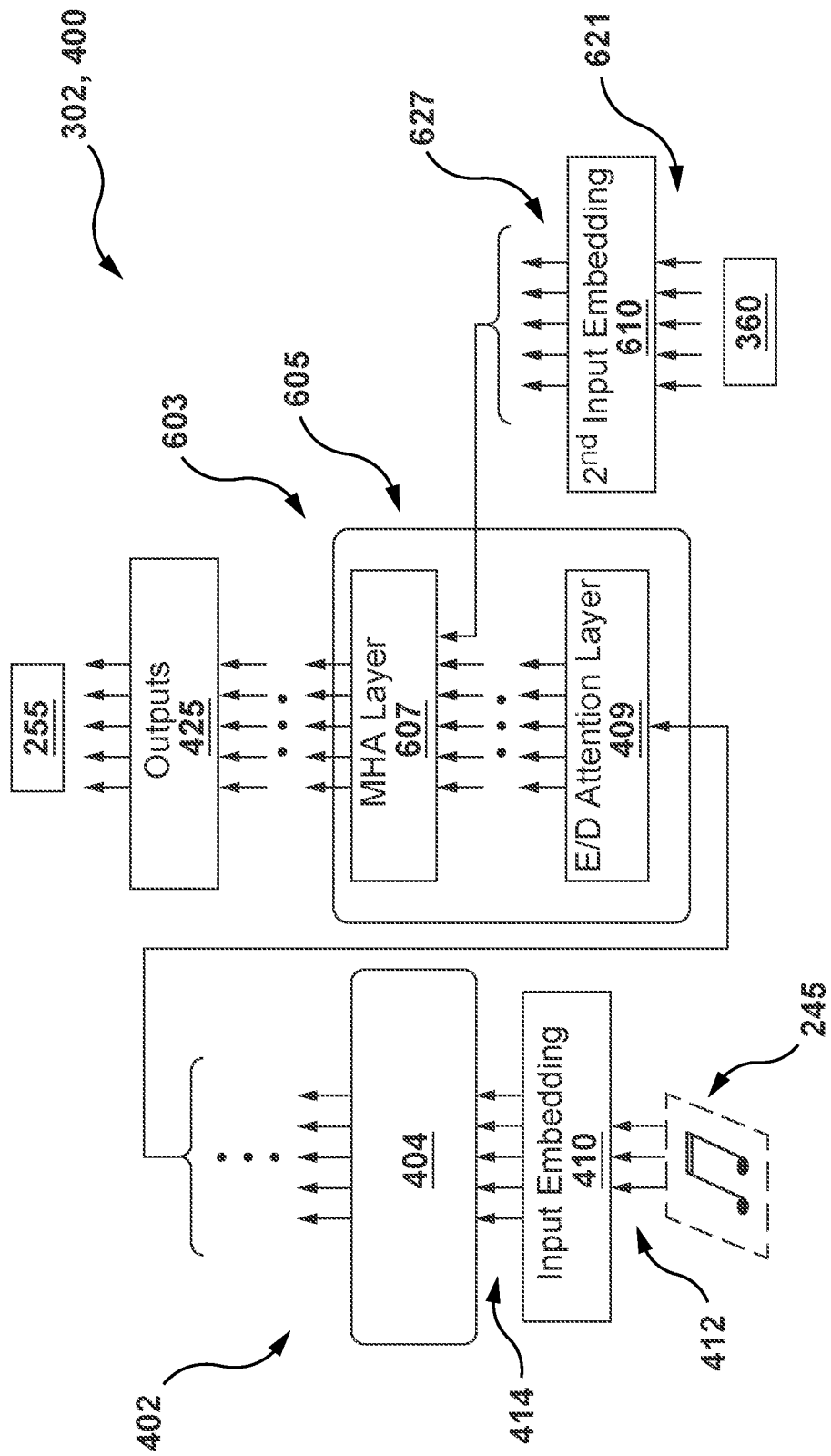
FIG. 7 depicts a schematic diagram of the STT model of FIG. 6 during an in-use process thereof, in accordance with the non-limiting embodiments of the present technology.

According to certain non-limiting embodiments of the present technology, the server 250 can be configured to use the previous machine-generated text string 360 as the context for the given user utterance 235 when generating, using the STT model 302, the textual utterance representation 255 of the give user utterance 235, as described further above with reference to FIG. 7.

The method 800 thus proceeds to step 806.

STEP GENERATING, BY THE SERVER USING A SPEECH-TO-TEXT (STT) MODEL, AN OTHER TEXT STRING BASED ON THE AUDIO SIGNAL AND THE MACHINE-GENERATED TEXT STRING, THE OTHER TEXT STRING BEING A TEXTUAL REPRESENTATION OF THE USER UTTERANCE WHILE TAKING INTO ACCOUNT THE MACHINE-GENERATED TEXT STRING AS A CONTEXT OF THE USER UTTERANCE

At step 806, the server 250 can be configured to generate, using the STT model 302, the textual utterance representation 255 of the given user utterance 235 taking into account the previous machine-generated text string 360 as the context therefor. As noted above, the previous machine-generated text string 360 has been used for generating the previous respective machine-generated utterance in response to which the user 230 provided the given user utterance 235.

According to certain non-limiting embodiments of the present technology, the STT model 302 can be implemented as a machine-learning model. For example, as described above with reference to FIG. 6, the STT model 302 can be implemented as a Transformer-based NN model having an encoder-decoder architecture, such as the machine-learning model architecture 400 described above with reference to FIG. 4. According to certain non-limiting embodiments of the present technology, the STT model 302 may have certain additional components, aside from those of the machine-learning model architecture 400.

More specifically, instead of the decoder stack of layers 403, the STT model 302 can have the STT decoder stack of layers 603 where the architecture of the given STT decoder block 605 differs from that of the given decoder block 405 in having the additional MHA layer 607 following the encoder-decoder MHA layer 409.

To that end, the server 250 can be configured to train the STT model 302 to generate the textual utterance representation 255 considering the previous machine-generated text string 360 as the context therefor, based on the STT training set of data, as described further below with reference to FIG. 6. More specifically, according to certain non-limiting embodiments of the present technology, the STT training set of data can include the plurality of STT training digital objects where the given STT training digital object 640 thereof can include (i) the training audio utterance representation 642, generated based on the given training user utterance of the given training user, in a similar fashion as described above with respect to generating the audio utterance representation 245; and (ii) the training textual utterance representation 644; and (iii) the training machine-generated text string 646, in response to receiving which at least one of the training audio utterance representation 642 and the training textual utterance representation 644 have been generated.

Thus, to train the STT model 302 to generate the textual utterance representation 255, the server 250 can be configured to feed the plurality of STT training digital objects thereto, feeding the given STT training digital object 640 including: (i) inputting, applying input embedding algorithm 410, training audio utterance representation 642 to the encoder stack of layers 402, such as to the given encoder block 404; (ii) inputting, applying the target embedding algorithm 415, the training textual utterance representation 644 to the STT decoder stack of layers 603, and more specifically, to the encoder-decoder MHA layer 409 of the given STT decoder block 605; and (iii) inputting, applying the second input embedding algorithm 610, the training machine-generated text string 646 to the additional MHA layer 607 of the given STT decoder block 605.

Further, the server 250 can be configured to use the so trained STT model 302 to generate the textual utterance representation 255. More specifically, as described above with reference to FIG. 7, to generate the textual utterance representation 255, the server 250 can be configured to: (i) input, applying the input embedding algorithm 410, the audio utterance representation 245 to the encoder stack of layers 402 of the STT model 302; and (ii) input, applying the second input embedding algorithm 610, the previous machine-generated text string 360 to the STT decoder stack of layers 603, and more specifically, to the additional MHA layer 607 of the given STT decoder block 605, as described further above with reference to FIG. 7.

Further, the server 250 can be configured to transmit, via the communication network 240, the textual utterance representation 255 to the second server 260 hosting the NLP model 304 and the TTS model 306. Thus, first, using the NLP model 304, based on the textual utterance representation 255, the second server 260 can be configured to generate the machine-generated text string 370. Second, using the TTS model 306, based on the machine-generated text string 370, the second server 260 can be configured to generate the respective machine-generated utterance 270 for transmission thereof to the electronic device 210 in response to the given user utterance 235, as described above with reference to FIGS. 4 and 5.

According to certain non-limiting embodiments of the present technology, each one of the NLP model 304 and the TTS model 306 can be implemented as a Transformer-based NN model and trained as described further above with reference to FIGS. 4 and 5.

By doing so, the server 250, using the STT model 302, can be configured to generate textual utterance representations of follow-up user utterances of the user 230 for the virtual assistant application 265. For example, to generate a respective textual utterance representation of a given follow-up user utterance provided by the user 230 in response to the machine-generated utterance 270, the server 250 can be configured to use the machine-generated text string 370, from the NLP model 304, as a context for the given follow-up user utterance, as described above with respect to the given user utterance 235.

Thus, certain embodiments of the method 800 allow increasing accuracy of speech recognition of user utterances provided by the STT model 302, which may further allow ameliorating the performance of the NLP model 304 and the TTS model 306 in providing machine-generated utterances in response to the user utterances. This may thus provide users with improved experience of interacting with virtual assistant applications.

The method 800 thus terminates.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of generating textual representations of a user utterance, the user utterance being collected by an electronic device associated with a user, the user utterance being provided in response to machine-generated utterances outputted by the electronic device, the electronic device being configured to be communicatively coupled with a server, the server for generating the machine-generated utterances, the method executable by the server, the method comprising:
   acquiring, by the server from the electronic device, an audio signal being an audio representation of the user utterance,
      the user utterance being in response to a given machine-generated utterance previously outputted by the electronic device to the user;
   acquiring, by the server, a machine-generated text string being a textual representation of the given machine-generated utterance; and
   generating, by the server using a Speech-to-Text (STT) model, another text string based on the audio signal and the machine-generated text string,
      the another text string being a textual representation of the user utterance while taking into account the machine-generated text string as a context of the user utterance.

2. The method of claim 1, wherein the method further comprises:
   generating, by the server using the STT model, a first text string based on a first audio signal,
      the first audio signal being an audio representation of a first user utterance and the first text string being a textual representation of the first user utterance;
   generating, by the server using another model, the machine-generated text string based on the first text string; and
   generating, by the server using a Text-to-Speech (TTS) model, a machine-generated audio signal based on the machine-generated text string,
      the machine-generated audio signal being an audio representation of the given machine-generated utterance.

3. The method of claim 1, wherein the STT model is a neural network (NN) having an encode-decoder architecture including an encoder stack of layers and a decoder stack of layers, and wherein the generating the another text string comprises:
   generating, by the server, using an acoustic embedding algorithm, an audio vector representative of the audio signal;
   inputting, by the server, the audio vector to the encoder stack of the NN;
   generating, by the server, using a text embedding algorithm, a text vector representative of the machine-generated text string; and
   inputting, by the server, the text vector to the decoder stack of the NN.

4. The method of claim 3, wherein the NN is a Transformer-based NN.

5. The method of claim 1, wherein the method further comprises, during a training phase, training the STT model based on a training set of data, the training set of data comprising a plurality of training objects, a given training object including: (i) an indication of a training audio signal generated based on a training user utterance uttered by a training user; (ii) a first training text string, the first training text string being a textual representation of the training user utterance; and (iii) a second training text string, the second training text string being a textual representation of a respective machine-generated utterance in response to which the training user has uttered the training user utterance, the second training text string used for providing a context for the first training text string.

6. The method of claim 2, wherein the method further comprises acquiring, by the server, the first audio signal from the electronic device.

7. The method of claim 2, wherein the method further comprises transmitting, by the server, the machine-generated audio signal to the electronic device.

8. The method of claim 2, wherein the another model includes a Natural Language Processing (NLP) model.

9. The method of claim 2, wherein the STT model, the TTS model, and the another model are hosted by another server.

10. The method of claim 8, wherein the NLP model is a Transformer-based NN model.

11. The method of claim 2, wherein the TTS model is a Transformer-based NN model.

12. The method of claim 2, wherein the method further comprises:
   generating, by the server using the STT model, a second text string based on a second audio signal,
      the second audio signal being an audio representation of a second user utterance, the second user utterance being a follow-up request to the given machine-generated utterance;
   generating, by the server using the another model, another machine-generated text string based on the second text string,
      the another machine-generated text string being a textual representation of another machine-generated utterance to be provided to the user;

generating, by the server using the TTS model, another machine-generated audio signal based on the another machine-generated text string,
the another machine-generated audio signal being an audio representation of the another machine-generated utterance to be provided to the user in response to the second user utterance;
acquiring, by the server, a third audio signal from the electronic device,
the third audio signal being an audio representation of a third user utterance, the third user utterance being another follow-up request to the another machine-generated utterance; and
generating, by the server using the STT model, a third text string based on the third audio signal, the machine-generated text string and the another machine-generated text string,
the third text string being a textual representation of the third user utterance while taking into account the machine-generated text string and the another machine-generated text string as the context of the another follow-up request.

13. The method of claim 12, wherein the method further comprises transmitting, by the server, the another machine-generated audio signal to the electronic device.

14. A server for generating textual representations of a user utterance, the user utterance being collected by an electronic device, communicatively coupled with the server, associated with a user, the user utterance being provided in response to machine-generated utterances outputted by the electronic device, the server comprising:
a processor;
a non-transitory computer-readable medium storing instructions; and
the processor, upon executing the instructions, being configured to:
acquire, from the electronic device, an audio signal being an audio representation of the user utterance, the user utterance being in response to a given machine-generated utterance previously outputted by the electronic device to the user;
acquire, a machine-generated text string being a textual representation of the given machine-generated utterance; and
generate, using a Speech-to-Text (STT) model, another text string based on the audio signal and the machine-generated text string,
the another text string being a textual representation of the user utterance while taking into account the machine-generated text string as a context of the user utterance.

15. The server of claim 14, wherein the processor is further configured to:
generate, using the STT model, a first text string based on a first audio signal,
the first audio signal being an audio representation of a first user utterance and the first text string being a textual representation of the first user utterance;
generate, using another model, the machine-generated text string based on the first text string; and
generate, using a Text-to-Speech (TTS) model, a machine-generated audio signal based on the machine-generated text string,
the machine-generated audio signal being an audio representation of the given machine-generated utterance.

16. The server of claim 14, wherein the STT model is a neural network (NN) having an encode-decoder architecture including an encoder stack of layers and a decoder stack of layers, and wherein the processor is configured to generate the another text string by:
generating, using an acoustic embedding algorithm, an audio vector representative of the audio signal;
inputting the audio vector to the encoder stack of the NN;
generating, using a text embedding algorithm, a text vector representative of the machine-generated text string; and
inputting, the text vector to the decoder stack of the NN.

17. The server of claim 16, wherein the NN is a Transformer-based NN.

18. The server of claim 14, wherein the processor is further configured, during a training phase, to train the STT model based on a training set of data, the training set of data comprising a plurality of training objects, a given training object including: (i) an indication of a training audio signal generated based on a training user utterance uttered by a training user; (ii) a first training text string, the first training text string being a textual representation of the training user utterance; and (iii) a second training text string, the second training text string being a textual representation of a respective machine-generated utterance in response to which the training user has uttered the training user utterance, the second training text string used for providing a context for the first training text string.

19. The server of claim 15, wherein the another model includes a Natural Language Processing (NLP) model.

20. The server of claim 15, wherein the STT model, the TTS model, and the another model are hosted by another server to which the server is communicatively coupled.

* * * * *